United States Patent
Kosugi et al.

(10) Patent No.: US 7,050,250 B2
(45) Date of Patent: May 23, 2006

(54) STORAGE APPARATUS AND STORAGE MEDIUM

(75) Inventors: Tatsuhiko Kosugi, Kawasaki (JP); Isamu Tomita, Kawasaki (JP); Kazunori Mori, Kawasaki (JP); Yoshiyuki Kagami, Kawasaki (JP); Ryuki Kubohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 61 days.

(21) Appl. No.: 10/787,064

(22) Filed: Feb. 25, 2004

(65) Prior Publication Data

US 2004/0223247 A1 Nov. 11, 2004

(30) Foreign Application Priority Data

May 9, 2003 (JP) .............................. 2003-131383

(51) Int. Cl.
*G11B 5/09* (2006.01)
(52) U.S. Cl. .......................................... 360/49; 360/48
(58) Field of Classification Search .................. 360/48, 360/49, 72.1, 77.08
See application file for complete search history.

(56) References Cited

U.S. PATENT DOCUMENTS

| | | | |
|---|---|---|---|
| 5,852,523 A | 12/1998 | Jung | 360/49 |
| 5,903,410 A * | 5/1999 | Blaum et al. | 360/77.08 |
| 5,909,336 A | 6/1999 | Schaffner et al. | 360/77.08 |
| 6,288,861 B1 | 9/2001 | Blaum et al. | 360/49 |
| 6,404,582 B1 * | 6/2002 | Rodrigues de Miranda | 360/77.08 |

FOREIGN PATENT DOCUMENTS

| | | |
|---|---|---|
| JP | 4337566 | 11/1992 |
| JP | 11003574 | 1/1999 |

OTHER PUBLICATIONS

ANONYMOUS: "A Distributed Index Method with Fault Tolerance" Research Disclosure, No. 443, Mar. 1, 2001, p. 475, XP002293380, Havant, UK, article No. 443141.

* cited by examiner

*Primary Examiner*—David Hudspeth
*Assistant Examiner*—Varsha A. Kapadia
(74) *Attorney, Agent, or Firm*—Greer, Burns & Crain, Ltd.

(57) ABSTRACT

There are provided a storage apparatus and a computer-readable recording medium, on whose storage areas, servo frames are arranged at uniform intervals in a spoke-like pattern. Each of the servo frames has an index bit storing section storing, as an index bit, part of an index pattern, which is operable to identify a storage area. The apparatus and the recording medium have a storage area recognizing unit for recognizing the storage areas based on the index bits, which are obtained by an index bit obtaining unit. The index bits, stored one in each of the index bit storing sections of the servo frames, are adapted to form, when being sequentially arranged, an index bit string in which such an index pattern repeatedly appears.

36 Claims, 14 Drawing Sheets

FIG. 3

| INDEX PATTERN NO. | INDEX PATTERN |
|---|---|
| 1 | 0 0 0 0 0 1 0 1 1 0 1 1 1 0 0 0 |
| 2 | 0 0 0 0 0 1 1 1 0 0 1 1 0 1 1 0 |
| 3 | 0 0 0 0 0 1 1 1 0 1 0 1 1 0 0 0 |
| 4 | 0 0 0 0 1 0 0 1 1 1 1 0 1 0 0 0 |
| 5 | 0 0 0 0 1 1 0 0 1 0 1 0 1 1 1 1 |
| 6 | 0 0 0 1 0 1 1 0 0 1 0 0 1 1 1 0 |
| 7 | 0 0 0 1 1 1 1 0 0 1 0 1 0 1 0 0 |
| 8 | 0 0 0 1 1 1 1 1 0 0 1 1 0 1 0 1 |

FIG. 4

| SF0 | SF1 | SF2 | SF3 | SF4 | SF5 | SF6 | SF7 | SF8 | SF9 | SF10 | SF11 | SF12 | SF13 | SF14 | SF15 |
|---|---|---|---|---|---|---|---|---|---|---|---|---|---|---|---|
| SF18 | SF19 | SF20 | SF21 | SF22 | SF23 | SF24 | SF25 | SF26 | SF27 | SF28 | SF29 | SF30 | SF31 | SF32 | SF33 |
| SF36 | SF37 | SF38 | SF39 | SF40 | SF41 | SF42 | SF43 | SF44 | SF45 | SF46 | SF47 | SF48 | SF49 | SF50 | SF51 |
| SF54 | SF55 | SF56 | SF57 | SF58 | SF59 | SF60 | SF61 | SF62 | SF63 | SF64 | SF65 | SF66 | SF67 | SF68 | SF69 |
| SF71 | SF72 | SF73 | SF74 | SF75 | SF76 | SF77 | SF78 | SF79 | SF80 | SF81 | SF82 | SF83 | SF84 | SF85 | SF86 |
| SF88 | SF89 | SF90 | SF91 | SF92 | SF93 | SF94 | SF95 | SF96 | SF97 | SF98 | SF99 | SF100 | SF101 | SF102 | SF103 |
| SF105 | SF106 | SF107 | SF108 | SF109 | SF110 | SF111 | SF112 | SF113 | SF114 | SF115 | SF116 | SF117 | SF118 | SF119 | SF120 |
| SF122 | SF123 | SF124 | SF125 | SF126 | SF127 | SF128 | SF129 | SF130 | SF131 | SF132 | SF133 | SF134 | SF135 | SF136 | SF137 |
| SF139 | SF140 | SF141 | SF142 | SF143 | SF144 | SF145 | SF146 | SF147 | SF148 | SF149 | SF150 | SF151 | SF152 | SF153 | SF154 |
| 0 | 0 | 0 | 0 | 0 | 1 | 0 | 1 | 1 | 0 | 1 | 1 | 1 | 0 | 0 | 0 |

FIG. 5

|  | 1 | 2 | 3 | 4 | 5 | 6 | 7 | 8 | 9 | 10 | 11 | 12 | 13 | 14 | 15 | 16 | HAMMING DISTANCE |
|---|---|---|---|---|---|---|---|---|---|---|---|---|---|---|---|---|---|
| INDEX PATTERN 1 | 0 | 0 | 0 | 0 | 0 | 1 | 0 | 1 | 1 | 0 | 1 | 1 | 1 | 0 | 0 | 0 | |
| 1-LINE SHIFT  | 0 | 0 | 0 | 0 | 0 | 0 | 1 | 0 | 1 | 1 | 0 | 1 | 1 | 1 | 0 | 0 | 6 |
| 2-LINE SHIFT  | 0 | 0 | 0 | 0 | 0 | 0 | 0 | 1 | 0 | 1 | 1 | 0 | 1 | 1 | 1 | 0 | 6 |
| 3-LINE SHIFT  | 0 | 0 | 0 | 0 | 0 | 0 | 0 | 0 | 1 | 0 | 1 | 1 | 0 | 1 | 1 | 1 | 6 |
| 4-LINE SHIFT  | 1 | 0 | 0 | 0 | 0 | 0 | 0 | 0 | 0 | 1 | 0 | 1 | 1 | 0 | 1 | 1 | 8 |
| 5-LINE SHIFT  | 1 | 1 | 0 | 0 | 0 | 0 | 0 | 0 | 0 | 0 | 1 | 0 | 1 | 1 | 0 | 1 | 8 |
| 6-LINE SHIFT  | 1 | 1 | 1 | 0 | 0 | 0 | 0 | 0 | 0 | 0 | 0 | 1 | 0 | 1 | 1 | 0 | 10 |
| 7-LINE SHIFT  | 0 | 1 | 1 | 1 | 0 | 0 | 0 | 0 | 0 | 0 | 0 | 0 | 1 | 0 | 1 | 1 | 10 |
| 8-LINE SHIFT  | 1 | 0 | 1 | 1 | 1 | 0 | 0 | 0 | 0 | 0 | 0 | 0 | 0 | 1 | 0 | 1 | 12 |
| 9-LINE SHIFT  | 1 | 1 | 0 | 1 | 1 | 1 | 0 | 0 | 0 | 0 | 0 | 0 | 0 | 0 | 1 | 0 | 10 |
| 10-LINE SHIFT | 0 | 1 | 1 | 0 | 1 | 1 | 1 | 0 | 0 | 0 | 0 | 0 | 0 | 0 | 0 | 1 | 10 |
| 11-LINE SHIFT | 1 | 0 | 1 | 1 | 0 | 1 | 1 | 1 | 0 | 0 | 0 | 0 | 0 | 0 | 0 | 0 | 8 |
| 12-LINE SHIFT | 0 | 1 | 0 | 1 | 1 | 0 | 1 | 1 | 1 | 0 | 0 | 0 | 0 | 0 | 0 | 0 | 8 |
| 13-LINE SHIFT | 0 | 0 | 1 | 0 | 1 | 1 | 0 | 1 | 1 | 1 | 0 | 0 | 0 | 0 | 0 | 0 | 6 |
| 14-LINE SHIFT | 0 | 0 | 0 | 1 | 0 | 1 | 1 | 0 | 1 | 1 | 1 | 0 | 0 | 0 | 0 | 0 | 6 |
| 15-LINE SHIFT | 0 | 0 | 0 | 0 | 1 | 0 | 1 | 1 | 0 | 1 | 1 | 1 | 0 | 0 | 0 | 0 | 6 |

FIG. 6

| M\N | 1 | 2 | 3 | 4 | 5 | 6 | 7 | 8 |
|---|---|---|---|---|---|---|---|---|
| 1 | 6 | 4 | 4 | 4 | 4 | 5 | 5 | 5 |
| 2 | 4 | 6 | 5 | 4 | 5 | 4 | 4 | 4 |
| 3 | 4 | 5 | 6 | 4 | 4 | 4 | 5 | 5 |
| 4 | 4 | 5 | 4 | 6 | 4 | 4 | 5 | 5 |
| 5 | 4 | 4 | 4 | 4 | 6 | 4 | 4 | 5 |
| 6 | 4 | 4 | 4 | 4 | 5 | 6 | 4 | 4 |
| 7 | 4 | 4 | 4 | 4 | 4 | 4 | 6 | 4 |
| 8 | 4 | 4 | 4 | 4 | 4 | 4 | 4 | 6 |

FIG. 7

| | |
|---|---|
| SECTOR PATTERN 1 | 0000111111100001 |
| SECTOR PATTERN 2 | 0111111100000010 |
| SECTOR PATTERN 3 | 0111000011100011 |
| SECTOR PATTERN 4 | 1011110011000100 |
| SECTOR PATTERN 5 | 1011001100100101 |
| SECTOR PATTERN 6 | 1100001111000110 |
| SECTOR PATTERN 7 | 1100110000100111 |
| SECTOR PATTERN 8 | 1101101010101000 |
| SECTOR PATTERN 9 | 1101010101001001 |
| SECTOR PATTERN 10 | 1010010110101010 |
| SECTOR PATTERN 11 | 1010101001001011 |
| SECTOR PATTERN 12 | 0110011001101100 |
| SECTOR PATTERN 13 | 0110100110001101 |
| SECTOR PATTERN 14 | 0001100101101110 |
| SECTOR PATTERN 15 | 0001011010001111 |
| SECTOR PATTERN 16 | 1110100101110000 |
| SECTOR PATTERN 17 | 1110011010010001 |
| SECTOR PATTERN 18 | 1001011001110010 |
| SECTOR PATTERN 19 | 1001100110010011 |
| SECTOR PATTERN 20 | 0101010110110100 |
| SECTOR PATTERN 21 | 0101101001010101 |
| SECTOR PATTERN 22 | 0010101010110110 |
| SECTOR PATTERN 23 | 0010010101010111 |
| SECTOR PATTERN 24 | 0011001111011000 |
| SECTOR PATTERN 25 | 0011110000111001 |
| SECTOR PATTERN 26 | 0100110011011010 |
| SECTOR PATTERN 27 | 0100001100111011 |
| SECTOR PATTERN 28 | 1000111100011100 |
| SECTOR PATTERN 29 | 1000000011111101 |
| SECTOR PATTERN 30 | 1111000000011110 |
| SECTOR PATTERN 31 | 1111111111111111 |
| SECTOR PATTERN 32 | 0000000000000000 |

FIG. 8

| SF0 | SF1 | SF2 | SF3 | SF4 | SF5 | SF6 | SF7 | SF8 | SF9 | SF10 | SF11 | SF12 | SF13 | SF14 | SF15 |
|---|---|---|---|---|---|---|---|---|---|---|---|---|---|---|---|
| 0 | 0 | 0 | 0 | 1 | 1 | 1 | 1 | 1 | 1 | 1 | 0 | 0 | 0 | 0 | 1 |
| SF18 | SF19 | SF20 | SF21 | SF22 | SF23 | SF24 | SF25 | SF26 | SF27 | SF28 | SF29 | SF30 | SF31 | SF32 | SF33 |
| 0 | 1 | 1 | 1 | 1 | 1 | 1 | 1 | 0 | 1 | 0 | 0 | 0 | 0 | 1 | 0 |
| SF36 | SF37 | SF38 | SF39 | SF40 | SF41 | SF42 | SF43 | SF44 | SF45 | SF46 | SF47 | SF48 | SF49 | SF50 | SF51 |
| 0 | 1 | 1 | 1 | 0 | 0 | 0 | 1 | 0 | 1 | 1 | 0 | 0 | 0 | 1 | 1 |
| SF54 | SF55 | SF56 | SF57 | SF58 | SF59 | SF60 | SF61 | SF62 | SF63 | SF64 | SF65 | SF66 | SF67 | SF68 | SF69 |
| 0 | 0 | 1 | 1 | 1 | 1 | 0 | 0 | 1 | 1 | 1 | 0 | 0 | 1 | 0 | 0 |
| SF71 | SF72 | SF73 | SF74 | SF75 | SF76 | SF77 | SF78 | SF79 | SF80 | SF81 | SF82 | SF83 | SF84 | SF85 | SF86 |
| 1 | 0 | 1 | 1 | 0 | 0 | 1 | 1 | 0 | 0 | 1 | 0 | 0 | 1 | 0 | 1 |
| SF88 | SF89 | SF90 | SF91 | SF92 | SF93 | SF94 | SF95 | SF96 | SF97 | SF98 | SF99 | SF100 | SF101 | SF102 | SF103 |
| 1 | 1 | 0 | 0 | 0 | 0 | 1 | 1 | 1 | 1 | 0 | 0 | 0 | 1 | 1 | 0 |
| SF105 | SF106 | SF107 | SF108 | SF109 | SF110 | SF111 | SF112 | SF113 | SF114 | SF115 | SF116 | SF117 | SF118 | SF119 | SF120 |
| 1 | 1 | 0 | 0 | 1 | 1 | 0 | 0 | 0 | 0 | 1 | 0 | 0 | 1 | 1 | 1 |
| SF122 | SF123 | SF124 | SF125 | SF126 | SF127 | SF128 | SF129 | SF130 | SF131 | SF132 | SF133 | SF134 | SF135 | SF136 | SF137 |
| 1 | 1 | 0 | 1 | 1 | 0 | 1 | 1 | 0 | 0 | 1 | 0 | 1 | 0 | 0 | 0 |
| SF139 | SF140 | SF141 | SF142 | SF143 | SF144 | SF145 | SF146 | SF147 | SF148 | SF149 | SF150 | SF151 | SF152 | SF153 | SF154 |
| 1 | 1 | 0 | 1 | 0 | 0 | 0 | 1 | 0 | 1 | 0 | 0 | 1 | 0 | 0 | 1 |

FIG. 12

| SECTOR PATTERN (BINARY NUMBER SYSTEM) | DECIMAL NUMBER SYSTEM |
|---|---|
| 0000000000000000 | 0 |
| 0000000011111111 | 255 |
| 0000111100001111 | 3855 |
| 0000111111110000 | 4080 |
| 0011001100110011 | 13107 |
| 0011001111001100 | 13260 |
| 0011110000111100 | 15420 |
| 0011110011000011 | 15555 |
| 0101010101010101 | 21845 |
| 0101010110101010 | 21930 |
| 0101101001011010 | 23130 |
| 0101101010100101 | 23205 |
| 0110011001100110 | 26214 |
| 0110011010011001 | 26265 |
| 0110100101101001 | 26985 |
| 0110100110010110 | 27030 |
| 1001011001101001 | 38505 |
| 1001011010010110 | 38550 |
| 1001100101100110 | 39270 |
| 1001100110011001 | 39321 |
| 1010010101011010 | 42330 |
| 1010010110100101 | 42405 |
| 1010101001010101 | 43605 |
| 1010101010101010 | 43690 |
| 1100001100111100 | 49980 |
| 1100001111000011 | 50115 |
| 1100110000110011 | 52275 |
| 1100110011001100 | 52428 |
| 1111000000001111 | 61455 |
| 1111000011110000 | 61680 |
| 1111111100000000 | 65280 |
| 1111111111111111 | 65535 |

STORAGE APPARATUS AND STORAGE MEDIUM

BACKGROUND OF THE INVENTION

1. Field of the Invention

The present invention relates to a storage apparatus having more than one round-shaped storage area. The invention particularly relates to a storage apparatus having a recording medium such as hard discs and a computer-readable recording medium whose storage areas can be easily recognized.

2. Description of the Related Art

FIG. 13 shows a previous magnetic storage apparatus in schematic form. The magnetic storage apparatus 100 has more than one circular magnetic disc 110 fixed to a spindle 130 of a SPM (Spindle Motor) at their centers (a center of rotation).

The magnetic disc 110 is a platter on which a magnetic recording layer is formed, and such a recording layer is provided on either side or both sides of the platters. The magnetic head 120 writes information on the surface (storage area) of the magnetic discs 110 and it also reads-out information recorded thereon.

The magnetic storage apparatus 100 has magnetic heads 120 provided one for each surface of the magnetic discs. A specific magnetic head 120 accesses a specific surface of a specific magnetic disc 110 to write/read data thereto/therefrom. The magnetic heads 120 are selected (head switching) as required to select a storage area to access.

When switching the magnetic heads 120, the magnetic storage apparatus 100 identifies which one of the storage areas the magnetic head 120 is currently accessing, to confirm that an intended proper magnetic head 120 is selected.

Generally speaking, the magnetic storage apparatus 100 is normally equipped with eight magnetic heads 120 at most. Therefore, numbers of "0" through "7" (in decimal number system) are represented in binary form ("000" through "111"), and these 3-bit information items are stored, one in each storage area of the magnetic discs 110, as information that identifies an individual magnetic head 120 (storage area)

FIG. 14 shows a magnetic disc, in schematic form, equipped to a previous magnetic storage apparatus. On the magnetic disc 110 of FIG. 14, there are provided servo frames 111 arranged at regular intervals in a radial manner, which servo frames 111 store information identifying the magnetic head 120.

For instance, the foregoing 3-bit information is stored in one of the servo frames 111 provided on the storage area. Alternatively, the three bits of the information can be separately stored, one in each of the servo frames 111 adjacent to each other. Such information is used to recognize the head numbers given to the magnetic heads 120. The magnetic head 120 reads-out this information to evaluate whether or not an intended head has been selected.

In addition, the magnetic storage apparatus 100 needs to detect where on the magnetic disc 110 the magnetic head 120 locates. In a previous magnetic storage apparatus 100, the magnetic head (not shown) reads-out index signals recorded in servo frames 111, and referring to the index signals, it is detected where on the magnetic disc 110 the magnetic head 120 locates.

For example, an index signal can be recorded in one of the servo frames 111 provided on a storage area, or alternatively, positioning information can be recorded in all the servo frames 111, so that the magnetic head 120 reads-out such information, thereby detecting where on the magnetic disc 110 the magnetic head 120 locates.

[Patent Document 1]
Japanese Patent Application Laid Open NO. HEI 11-3574 (FIG. 1)

[Patent Document 2]
Japanese Patent Application Laid Open NO. HEI 4-337566 (Pages 2 to 3)

However, the above-mentioned conventional magnetic storage apparatus 100 has the following problem relating to the methods for recording information identifying the magnetic head 120, that is, the method in which only one of the servo frames 111 on the storage area stores information (3-bit information) identifying the head number of the magnetic head 120, and the method in which the three bits of the information are separately stored, one in each of the servo frames 111 adjacent to each other. Since such information is read by the magnetic head 120, the apparatus must sometimes wait until the desired frames rotate to the magnetic head 120, thereby causing rotational delay time as long as one disc rotation at the maximum.

When detecting an index signal, the method in which only one of the servo frames 111 on the storage area stores information (3-bit information) identifying the head number of the magnetic head 120 has the following problem: since the index signal is read by the magnetic head 120, the device must sometimes wait until the desired frames rotate to the magnetic head 120, thereby causing rotational delay time as long as one disc rotation at the maximum. Additionally, if the index signal is defective due to any reasons, it cannot be read out, so that positioning control of the magnetic head 120 is unavailable.

Further, the method in which positioning information is recorded in all the servo frames 111 has the following problem: servo frame length is increased, thereby affecting efficient use of the magnetic disc 110. In a case where 256 servo frames 111 are formed on a storage area (magnetic disc 110), for example, at least eight bits ($2^8=256$) need to be prepared in each servo frame 111 for storing the positioning information.

SUMMARY OF THE INVENTION

With the foregoing problems in view, one object of the present invention is to provide a storage apparatus and a computer-readable recording medium that have storage areas which are rapidly and reliably recognized, and positions on which storage areas are also rapidly and reliably recognized, and which storage areas are used in an efficient manner.

In order to accomplish the above objects, according to the present invention, there are provided a storage apparatus having more than one round storage area, on which servo frames are arranged at uniform intervals in a spoke-like pattern. The apparatus comprises: an index bit storing section provided to each servo frame arranged in an individual storage area, which index bit storing section stores, as an index bit, part of an index pattern having a specific bit pattern, which index pattern is operable to identify the individual storage area; an index bit obtaining unit for obtaining such index bits, stored one in each of the index bit storing sections of the individual servo frames arranged in the individual storage area, one after another; and a storage area recognizing unit for recognizing the individual storage area based on the index bits, which are obtained by the index bit obtaining unit. The index bits are adapted to form an index bit string, when being sequentially arranged, in which the index pattern having the identical bit pattern appears repeatedly.

As a preferred feature, each storage area is associated with such an index pattern that is unique to the storage area. In addition, the hamming distance between any two of the index patterns, which are associated one with each storage area, is a predetermined value or greater.

As another preferred feature, the storage apparatus further comprises a provisional index pattern obtaining unit for obtaining a provisional index pattern based on the index bits obtained by the index bit obtaining unit; a first hamming distance calculator for calculating the hamming distances between the provisional index pattern, which is obtained by the provisional index pattern obtaining unit, and the index patterns; and an index pattern verifying unit for verifying that the provisional index pattern is one of the index patterns, based on the hamming distances, which are calculated by the first hamming distance calculator. On the basis of the index pattern verified by the index pattern verifying unit, the storage area recognizing unit recognizes the storage area that is associated with the verified index pattern.

As a further preferred feature, the storage apparatus further comprises: a sector bit storing section provided to each servo frame arranged in the storage areas, which sector bit storing section stores, as a sector bit, part of a sector pattern which is operable to identify the position of each index pattern in the individual storage area, in association with its corresponding index bit storing section; a sector bit obtaining unit for obtaining such sector bits one after another from the sector bit storing sections of the servo frames arranged in the individual storage area; and a position recognizing unit for recognizing the positions of the servo frames in the individual storage area based on such sector bits obtained by the sector bit obtaining unit.

As a still further preferred feature, in the individual storage areas, each index pattern is associated with a unique sector pattern that is unique to the index pattern. In addition, the hamming distance between any two of the unique sector patterns, which are associated one with each of the index patterns, is a predetermined value or greater.

As still another preferred feature, the storage apparatus further comprises: a provisional sector pattern obtaining unit for obtaining a provisional sector pattern based on the sector bits obtained by the sector bit obtaining unit; a second hamming distance calculator for calculating the hamming distance between the provisional sector pattern, which is obtained by the provisional sector pattern obtaining unit, and the sector pattern; and an sector pattern verifying unit for verifying that the provisional sector pattern is one of the sector patterns, based on the hamming distance, which is calculated by the first hamming distance calculator. On the basis of the sector pattern that is verified by the sector pattern verifying unit, the position recognizing unit recognizes where in the individual storage area the servo frames locates which have the sector bit storing sections storing the sector bits composing the provisional sector pattern.

As a generic feature, there is provided a storage medium having more than one round storage area, on which servo frames are arranged at uniform intervals in a spoke-like pattern. The medium comprises an index bit storing section provided to each servo frame arranged in an individual storage area, which index bit storing section stores, as an index bit, part of an index pattern having a specific bit pattern, which index pattern is operable to identify the individual storage area. The index bits are adapted to form an index bit string, when being sequentially arranged, in which the index pattern having the identical bit pattern appears repeatedly.

As a preferred feature, each storage area is associated with such an index pattern that is unique to the storage area. In addition, the hamming distance between any two of the index patterns, which are associated one with each storage area, is a predetermined value or greater.

As another preferred feature, the storage medium further comprises a sector bit storing section provided to each servo frame arranged in the storage areas, which sector bit storing section stores, as a sector bit, part of a sector pattern, which is operable to identify the position of each index pattern in the individual storage area, in association with its corresponding index bit storing section. The sector bits are adapted to form a sector bit string, when being sequentially arranged, which includes the sector pattern.

As still another preferred feature, in the individual storage areas, each index pattern is associated with a unique sector pattern that is unique to the index pattern. In addition, the hamming distance between any two of the unique sector patterns, which are associated one with each of the index patterns, is a predetermined value or greater.

The storage apparatus and the computer-readable recording medium of the present invention guarantee the following advantageous results.

(1) In an individual storage area, index bits stored, one in each of the index bit storing sections of the individual servo frames, are sequentially arranged, thereby forming an index bit string. Since this index bit string contains more than one index pattern having an identical bit pattern, it is possible to rapidly recognize the storage area with high reliability, based on the index bits stored in the individual index bit storing sections of the servo frames.

(2) Since only part of such an index pattern, which identifies a storage area, is stored in the index bit storing sections of the servo frames, which are arranged on the storage area at regular intervals in a radial manner, it is possible to efficiently use the storage area.

(3) Since an individual storage area is associated with an index pattern unique to the storage area, it is possible to recognize the storage area at high speed with high reliability, by identifying its associated index pattern. That is, on the basis of the index bits obtained by the index bit obtaining unit, it is possible to recognize specific one of the storage areas, thereby facilitating high-speed and highly reliable recognition of the storage area.

(4) Since the individual storage areas are associated with index patterns which have such bit patterns that the hamming distance between any two of the index patterns takes a predetermined value or greater, it is possible to recognize the storage areas with high redundancy.

(5) On the basis of the hamming distances between a provisional index pattern and the index patterns previously assigned to the individual storage areas, it is possible to confirm that the provisional index pattern is such an index pattern. It is thus possible to recognize the provisional index pattern as an original index pattern, and on the basis of the thus recognized index pattern, it is also possible to identify its associated storage area with ease.

(6) Since a sector pattern is employed to recognize the position of each index pattern in the storage area, so that the position of each servo frame in the storage area is also recognized, it is possible to rapidly and reliably recognize where on the storage area the sector bit obtaining unit (index bit obtaining unit) locates.

(7) Since part of such a sector pattern, which identifies the position of an index pattern in an individual storage area, is stored, as a sector bit, in each sector bit storing section in association with its corresponding index bit storing section, it is possible to use the storage area in an efficient manner.

(8) Since the index patterns having an identical bit patterns are associated with different sector patterns, it is possible to recognize an index pattern by identifying its associated sector pattern. Therefore, it is also possible to easily recognize the positions of the servo frames on the storage area, each of which servo frames has an index bit storing section that stores one of the index bits composing the index pattern, so that the position of the sector bit obtaining unit (index bit obtaining unit) on the storage area can be rapidly recognized with high reliability.

(9) Since the sector patterns, each of which is unique to its associated index pattern, have such bit patterns that the hamming distance between any two of the sector patterns takes a predetermined value or greater, it is possible to recognize the sector patterns with high redundancy.

(10) On the basis of the hamming distances between a provisional sector pattern and the sector patterns previously given to a storage area, it is possible to confirm that the provisional sector pattern is one of such sector patterns, and on the basis of the thus identified sector pattern, the positions of the servo frames on the storage area, each of which servo frames has a sector bit storing section that stores an individual one of the sector bits composing the provisional sector pattern, are easily recognized, so that the position of the sector bit obtaining unit (index bit obtaining unit) on the storage area can be rapidly recognized with high reliability.

Other objects and further features of the present invention will be apparent from the following detailed description when read in conjunction with the accompanying drawings.

BRIEF DESCRIPTION OF THE DRAWINGS

FIG. 3 is a table showing examples of index patterns used in a magnetic disc device according to the present invention;

FIG. 4 is a table showing an example of an index bit string stored in a specific storage area of the magnetic disc device of FIG. 1;

FIG. 5 is a view illustrating the hamming distances between an index pattern used in the magnetic disc device of FIG. 1 and the bit patterns that are obtained by shifting the index pattern by one bit or more;

FIG. 6 is a table showing the hamming distances between pairs of index patterns used in the magnetic disc device of FIG. 1.

FIG. 7 is a table showing an example of a sector pattern used in the magnetic disc device of FIG. 1;

FIG. 8 is a table showing examples of sector bit strings in the specific storage area of the magnetic disc device of FIG. 1;

FIG. 12 is a table showing other examples of sector patterns used in the magnetic disc device according to the present embodiment;

DESCRIPTION OF THE PREFERRED EMBODIMENT(S)

One preferred embodiment of the present invention will be described hereinbelow with reference to the relevant accompanying drawings.

Figure 1:
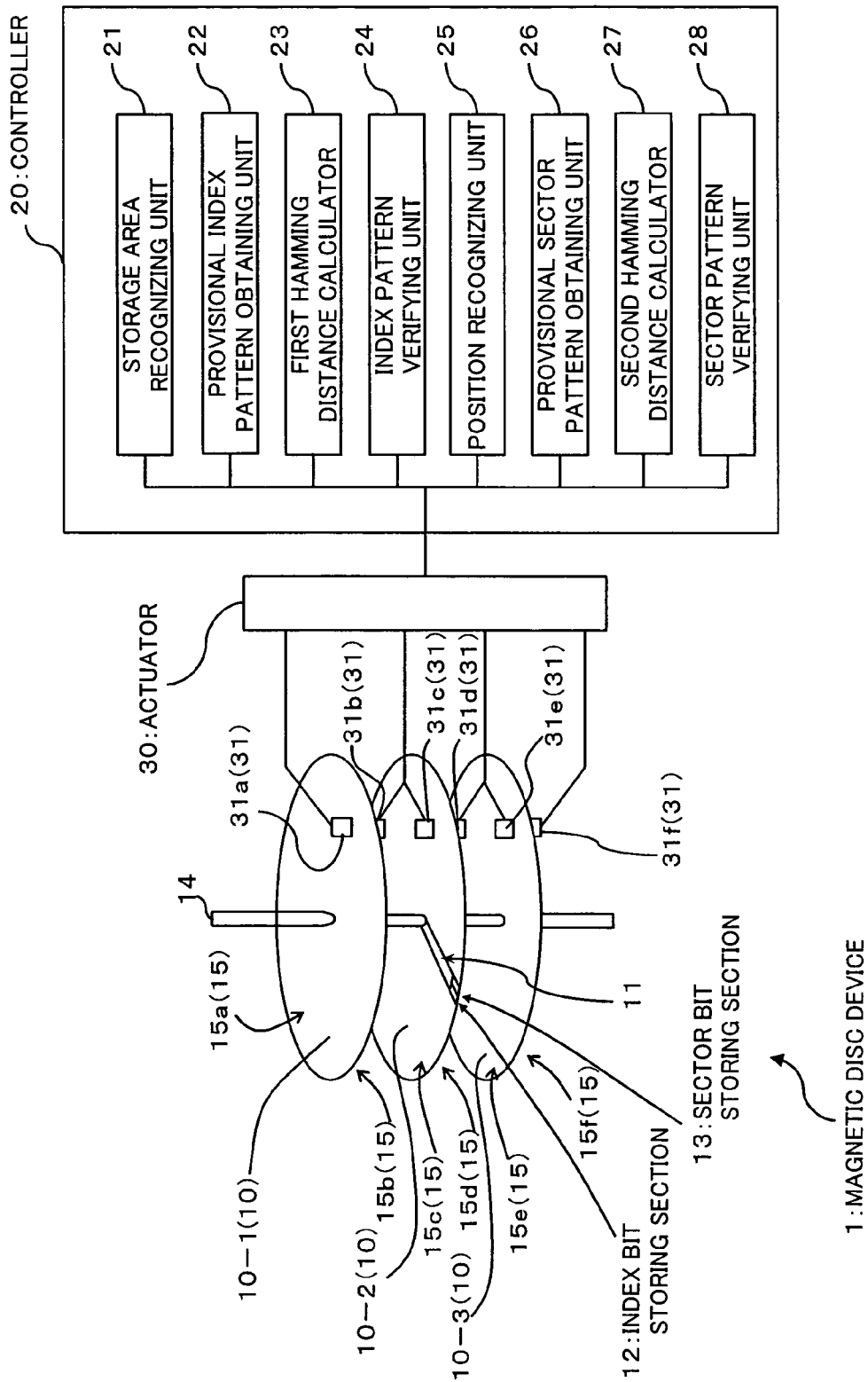
FIG. 1 is a block diagram schematically showing a magnetic disc device (storage apparatus) according to one preferred embodiment of the present invention.

FIG. 1 depicts a construction of a magnetic disc device (storage apparatus) according to one preferred embodiment of the present invention.

The magnetic disc device 1 has more than one (three in the example of FIG. 1) magnetic disc (storage medium) 10 (10-1, 10-2, 10-3). One of these discs, 10-1, 10-2, and 10-3, is arbitrarily selected to write various kinds of data thereto and also to read such data therefrom.

The magnetic disc device 1 is used as a storage apparatus in a computer system, for example, to send data read out from the magnetic disc, 10-1, 10-2, 10-3, to a computer, and to record data received from the computer onto the magnetic disc, 10-1, 10-2, 10-3.

As shown in FIG. 1, the magnetic disc device 1 has magnetic discs 10 (10-1, 10-2, 10-3), magnetic heads (index bit obtaining unit, sector bit obtaining unit) 31 (31a, 31b, 31c, 31d, 31e, 31f), an actuator 30, and a controller 20.

The magnetic discs, 10-1, 10-2, 10-3, are placed along a spindle 14 of a spindle motor 50 (see FIG. 10) at regular intervals in such a manner that the spindle 14 passes through the center (rotation center) of the magnetic disc, 10-1, 10-2, 10-3. This spindle motor 50 is activated to rotate, thereby causing the magnetic discs, 10-1, 10-2, 10-3, to rotate about the spindle 14. Each of the magnetic discs, 10-1, 10-2, 10-3, is given approximately the same construction.

In the following description, such a magnetic disc will be designated as "10-1," "10-2," or "10-3" when description is made for one specific magnetic disc, whereas "10" is used when an arbitrary one is subjected to description.

The magnetic disc 10 is given as a disc (platter). On the surfaces of both sides of the magnetic disc 10, there are formed magnetic recoding layers, and such a surface (circular surface) of the magnetic disc 10 is hereinafter called a "storage area 15." The magnetic disc 10-1 of the magnetic disc device 1 has storage areas 15a and 15b; the magnetic disc 10-2 has storage areas 15c and 15d; the magnetic disc 10-3 has storage areas 15e and 15f.

In addition, character letter "15a," "15b," "15c," "15d," "15e," or "15f" is used when referring to a specific one of the storage areas of the magnetic disc 10, whereas character letter "15" is used when referring to an arbitrary storage area.

In the magnetic disc device 1, a magnetic head 31 (will be detailed later) reads-out data recorded on the surface of the magnetic disc 10, and also writes data onto a storage area 15.

Figure 2:
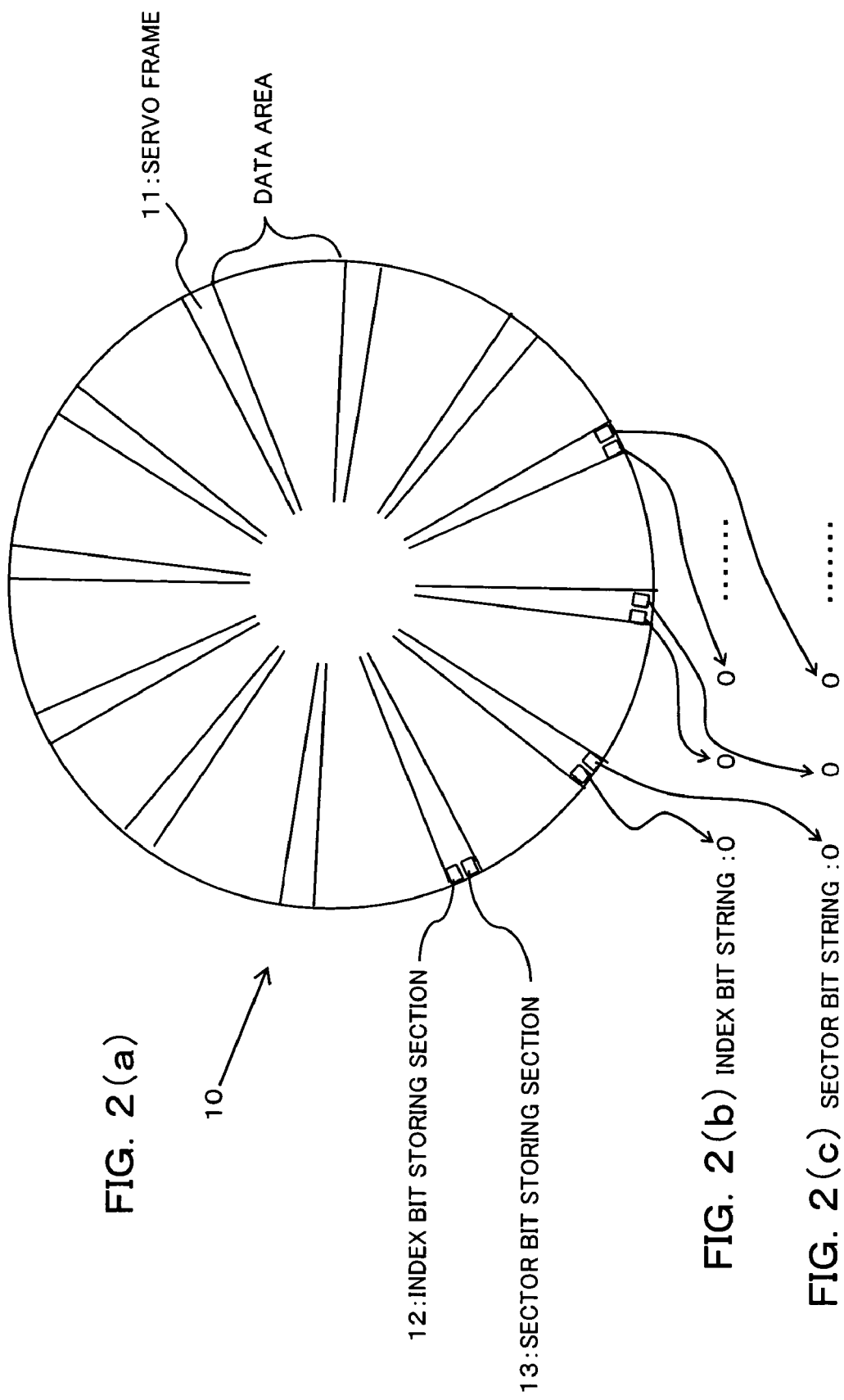
FIG. 2(a) is a plan view schematically showing a magnetic disc provided to the magnetic disc device of FIG. 1.
FIG. 2(b) is a view for describing a method for obtaining an index bit string from the magnetic disc of FIG. 2(a)
FIG. 2(c) is a method for obtaining a sector bit string from the magnetic disc of FIG. 2(a)

FIG. 2(a) schematically shows the magnetic disc 10 provided to the magnetic disc device 1, and FIG. 2(b) shows how to obtain an index bit string from the magnetic disc 10, and FIG. 2(c) shows how to obtain a sector bit string from the magnetic disc 10.

As shown in FIG. 2(a), servo frames 11 are arranged at regular intervals in a spoke-like manner on the magnetic disc (storage medium) 10. Each of the servo frames 11 has an index bit storing section 12, a sector bit storing section 13, and a servo mark (not shown in FIG. 2(a); see FIG. 9) that indicates the beginning of an individual servo area. The index bit storing section 12 stores part of an index pattern as an index bit, and the sector bit storing section 13 stores part of a sector pattern as a sector bit.

Such an index pattern is for identifying a storage area, and in the magnetic disc device 1, index patterns with different bit patterns are provided one for each storage area 15.

FIG. 3 shows example bit patterns of the index patterns used in the magnetic disc device 1. There are shown eight kinds of index patterns. Note that the index patterns shown in FIG. 3 are 16-bit information.

In the magnetic disc device 1, an individual storage area 15 of the magnetic disc 10 is associated with one of the index patterns shown in FIG. 3. Here, in order to differentiate the eight types of index patterns in FIG. 3, NO.1 through NO.8 (index pattern number) is sometimes added. In concrete, index pattern "0000010110111000" is called index pattern 1; index pattern "0000011100110110" is called index pattern 2; index pattern "0000011101011000" is called index pattern 3; index pattern "0000100111101000" is called index pattern 4; index pattern "0000110010101111" is called index pattern 5; index pattern "0001011001001110" is called index pattern 6; index pattern "0001111001010100" is called index pattern 7; and index pattern "0001111100110101" is called index pattern 8.

The index bit storing section 12 of an individual servo frame 11 on a storage area 15, stores part (one bit according to the present embodiment) of an index pattern that is uniquely associated with the storage area 15.

More specifically, as shown in FIG. 2(b), the index bits stored one in each of the index bit storing sections 12 of the servo frames 11, are successively collected in the order in which the storage area 15 proceeds, beginning from the leading servo frame (index frame) 11, so as to form an index bit string, in which an identical index pattern appears repeatedly.

Hereinafter, for convenience of description, such index bits stored in the index bit storing sections of the servo frames 11 are sometimes simply called "index bits stored in the servo frames 11". In addition, the index pattern uniquely assigned to each storage area 15, in advance, is sometimes called an "original index pattern".

As for the index pattern that repeatedly appears in the storage area 15, it is preferred that a predetermined pattern (hereinafter called a "gap pattern") is provided between every index pattern and its following index pattern. As an example of this gap pattern, a predetermined number of 0s successively arranged can be used.

FIG. 4 shows an example of an index bit string for a specific storage area 15 in the magnetic disc device 1 according to one preferred embodiment of the present invention. The storage area 15 contains 156 servo frames 11 (SF0 through SF155), and the index bits stored one in each of the index bit storing sections 12 of the servo frames SF0 through SF 155 are sequentially arranged.

In the example of FIG. 4, the index pattern 1, "0000010110111000," is assigned to the storage area 15. It is to be noted that index bits stored in servo frames SF16, SF17, SF34, SF35, SF52, SF53, SF70, SF87, SF104, SF121, SF138, and SF155 (not shown in FIG. 4) form gap patterns, and 0s are stored therein.

With reference to FIG. 4, the index bit storing sections 12 of the servo frames SF0, SF1, SF2, SF3, SF4, SF6, SF9, SF13, SF14, and SF15, store index bit 0s, while the index bit storing sections 12 of the servo frames SF5, SF7, SF8, SF10, SF11, and SF12, store index bit 1s. The index bit storing sections 12 of the servo frames SF16 and SF17 store 0s so that they serve as a gap pattern.

The index bits stored in the servo frames SF0 through SF15 are arranged in turn, thereby forming an index bit string which makes index pattern 1. Likewise, the index bits stored in the servo frames SF18 through SF33, those stored in the servo frames SF36 through SF51, those stored in the servo frames SF54 through SF69, those stored in the servo frames SF71 through SF86, those stored in the servo frames SF88 through SF103, those stored in the servo frames SF105 through SF120, those stored in the servo frames SF122 through SF137, and those stored in the servo frames SF139 through SF154, are arranged in turn, thereby forming index bit strings which also make index pattern 1.

That is, index bits stored in the index bit storing sections 12 of the servo frames 11 are sequentially arranged, thereby making an index bit string, which includes more than one index pattern 1 having the same bit pattern.

Further, the index pattern used in the magnetic disc device 1 has the following characteristics: (1) the hamming distances between an object index pattern itself and the bit patterns obtained by shifting the object index pattern by one bit or more, are a predetermined value (6 in the present embodiment) or greater; (2) the hamming distances between pairs of index patterns are a predetermined value (4 in the present embodiment) or greater. Here, the hamming distance (signal distance) is the number of digit positions in which the corresponding digits of two binary patterns of the same length (the number of bits) are different.

FIG. 5 shows the hamming distances between index pattern 1, which is used in the magnetic disc device 1 of the present embodiment, and bit patterns that are obtained by shifting the index pattern 1 by one bit (place) or more, respectively.

As shown in FIG. 5, index pattern 1 has a bit pattern of "0000010110111000", and a bit pattern obtained by shifting index pattern 1 by one place to the right is "0000001011011100". The hamming distance between these two patterns is 6. Likewise, the hamming distances between index pattern 1 and bit patterns obtained by shifting index pattern 1 by two through 15 places to the right, respectively, are 6 to 12.

That is, as for this index pattern 1, the hamming distance between index pattern 1 and any one of the bit patterns that are obtained by shifting index pattern 1 by one or more places, is always 6 or greater. Although not explicitly shown, as for index patterns 2 through 8 in FIG. 3, the hamming distances between such an individual pattern and the bit patterns obtained by shifting the individual pattern by one place or more are always 6 or greater.

FIG. 6 shows the hamming distances between pairs of index patterns used in the magnetic disc device 1 according to the present embodiment. It shows the hamming distances between an arbitrary one of the index patterns 1 through 8 and the remaining index patterns. Note that, in FIG. 6, both the character letters "M" and "N" indicate index pattern numbers.

As shown in FIG. 6, an individual index pattern in FIG. 3 has a hamming distance of 4 or greater with the other remaining index patterns.

A sector pattern is for identifying a position of an individual index pattern in the storage area 15. In the magnetic disc device 1 of the present embodiment, there are provided, in advance, different sector patterns, one for each of the index patterns in the storage area 15.

FIG. 7 shows example sector patterns used in the magnetic disc device 1. There are shown 32 kinds of sector patterns, each of which is 16-bit information. In order to differentiate such 32 different sector patterns in the following description, NO. 1 through No. 32 (sector pattern numbers), are used to designate those patterns; those patterns are called "sector pattern 1", "sector pattern 2" "sector pattern 32".

In the magnetic disc device 1 according to the present embodiment, an individual sector pattern, sector pattern 1 through sector pattern 32, in FIG. 7 is associated in turn with one of the index patterns in the storage area 15, starting from the leading index pattern (which starts from the index frame).

The sector bit storing section 13 of each servo frame 11 of the storage area 15 stores part (one bit in the present embodiment) of such a sector pattern.

In the storage area 15, as shown in FIG. 2(c), 16 or more of the sector bits stored, one in each of the sector bit storing sections 13 of the servo frames 11 that are consecutively arranged in the direction in which the storage area 1 rotates, are obtained and arranged to form a sector bit string. In the thus obtained sector bit string, there appears one of the sector patterns shown in FIG. 7.

Specifically, in the aforementioned index bit string, the servo frames 11 composing the index pattern store sector bits, in such a manner that, when the sector bits are sequentially arranged, they form a sector bit string that includes one of the sector patterns of FIG. 7.

Hereinafter, for convenience of description, such sector bits stored in the sector bit storing sections of the servo frames 11 are sometimes simply called "sector bits stored in the servo frames 11". In addition, the sector patterns previously assigned, one to each index pattern, are sometimes called "original sector patterns".

Further, as in the case of the aforementioned index pattern, between every sector patterns and its following sector pattern in the sector bit string on one single storage area 15, there is provided a gap pattern, which is composed of the same number of bits as those of gap patterns provided between the index patterns adjacent to each other. As an example of such a gap pattern, a gap pattern composed of a predetermined number of 0s successively arranged can be used.

FIG. 8 shows an example of a sector bit string for a specific storage area 15 in the magnetic disc device 1 according to the present embodiment of the present invention. Sector bits stored, one in each sector bit storing section 13 of the servo frames SF0 through SF155, are sequentially arranged in the table of FIG. 8. The sector bit string of FIG. 8 is associated with the index bit string of FIG. 4, and servo frames represented by SF0 through SF155 of FIG. 8 are the same as those represented by SF0 through SF155 of FIG. 4, respectively.

Note that sector bits stored in servo frames SF16, SF17, SF34, SF35, SF52, SF53, SF70, SF87, SF104, SF121, SF138, and SF155 (not shown in FIG. 8) form gap patterns, and 0s are stored therein.

Referring to FIG. 8, the sector bit storing sections 13 of the servo frames SF0, SF1, SF2, SF3, SF11, SF12, SF13, and SF14, store index bit 0s, while the sector bit storing section 13 of the servo frames SF4, SF5, SF6, SF7, SF8, SF9, SF10, and SF15, store index bit 1s.

That is, the sector bits stored in the servo frames SF0 through SF15 are sequentially arranged, thereby forming a sector bit string having a sector pattern of "0000111111100001 (sector pattern 1)". Likewise, the sector bits stored in the servo frames SF18 through SF33 are arranged in turn, thereby forming a sector bit string having a sector pattern of "0111111100000010 (sector pattern 2)"; the sector bits stored in the servo frames SF36 through SF51 are arranged in turn, thereby forming a sector bit string having a sector pattern of "0111000011100011 (sector pattern 3)".

Further, the sector bits stored in the servo frames SF54 through SF69 are arranged in turn, thereby forming a sector bit string having a sector pattern of "1011110011000100 (sector pattern 4)";the sector bits stored in the servo frames SF71 through SF86 are arranged in turn, thereby forming a sector bit string having a sector pattern of "1011001100100101 (sector pattern 5)".

Still further, the sector bits stored in the servo frames SF88 through SF103 are arranged in turn, thereby forming a sector bit string having a sector pattern of "1100001111000110 (sector pattern 6)"; the sector bits stored in the servo frames SF105 through SF120 are arranged in turn, thereby forming a sector bit string having a sector pattern of "1100110000100111 (sector pattern 7)".

Furthermore, the sector bits stored in the servo frames SF122 through SF137 are arranged in turn, thereby forming a sector bit string having a sector pattern of "1101101010101000 (sector pattern 8)"; the sector bits stored in the servo frames SF139 through SF154 are arranged in turn, thereby forming a sector bit string having a sector pattern of "1101010101001001 (sector pattern 9)".

In the storage area 15, the index pattern (leading index pattern) composed of the index bits stored in servo frames SF0 through SF15 is associated with sector pattern 1. Likewise, the index pattern composed of the index bits stored in servo frames SF18 through SF33 is associated with sector pattern 2; the index pattern composed of the index bits stored in servo frames SF36 through SF51 is associated with sector pattern 3.

Further, the index pattern composed of the index bits stored in servo frames SF54 through SF69 is associated with sector pattern 4; the index pattern composed of the index bits stored in servo frames SF71 through SF86 is associated with sector pattern 5.

Still further, the index pattern composed of the index bits stored in servo frames SF88 through SF103 is associated with sector pattern 6; the index pattern composed of the index bits stored in servo frames SF105 through SF120 is associated with sector pattern 7.

In addition, the index pattern composed of the index bits stored in servo frames SF122 through SF137 is associated with sector pattern 8; the index pattern composed of the index bits stored in servo frames SF139 through SF154 is associated with sector pattern 9.

The low-order five bits of an individual sector pattern in FIG. 7 represent a binary value. Likewise, the low-order five bits of sector pattern 1 through sector pattern 9 in FIG. 8 represent binary values 00001 through 01001, or 1 through 9 in decimal number system, respectively. Such low-order five bits of an individual sector pattern indicate "how manieth" sector pattern in a series of sector patterns prepared on the storage area 15 the individual sector pattern is, when counted from the leading sector pattern. The term "how manieth" refers to wherein the series/sequence of sector patterns the object sector pattern locates. A number such low-order five bits represent will be also called a sector number.

With the magnetic disc device 1, by using low-order five bits of a sector pattern, it is possible to recognize how manieth sector pattern, when counted from the leading sector pattern, an object sector pattern is in a series of sector patterns set in the storage area 15, thereby making it also possible to recognize how manieth index pattern, when counted from the leading index pattern, an index pattern that is associated with the object sector pattern is. As a result, it is also possible to identify where in the storage area 15 the servo frames are located that store index bits composing the object index pattern and that also store sector bits composing the object sector pattern.

A magnetic head (index bit obtaining unit, sector bit obtaining unit) 31 (31a, 31b, 31c, 31d, 31e, 31f) reads various kinds of data from the magnetic disc 10 and also writes such data onto the magnetic disc 10. An actuator 30 enables the magnetic head 31 to travel in the direction of the radius of the magnetic disc 10.

According to the present embodiment, a magnetic head 31a writes/reads data onto/from the storage area 15a. Likewise, a magnetic head 31b writes/reads data onto/from the storage area 15b; a magnetic head 31c writes/reads data onto/from the storage area 15c; a magnetic head 31d writes/reads data onto/from the storage area 15d; a magnetic head 31e writes/reads data onto/from the storage area 15e; a magnetic head 31f writes/reads data onto/from the storage area 15f. As for character letters designating such magnetic discs, a character letter of "31a", "31b", "31c", "31d", "31e", or "31f" is used when one of the magnetic heads is to be specified, whereas "31" is used when an arbitrary magnetic head is referred to.

The magnetic head 31 of the magnetic disc device 1 serves as an index bit obtaining unit, which sequentially obtains index bits stored, one in each of the index bit storing sections 12 of the servo frames 11, and it also serves as a sector bit obtaining unit, which sequentially obtains sector bits stored, one in each of the sector bit storing sections 13 of the servo frames 11.

Figure 9:
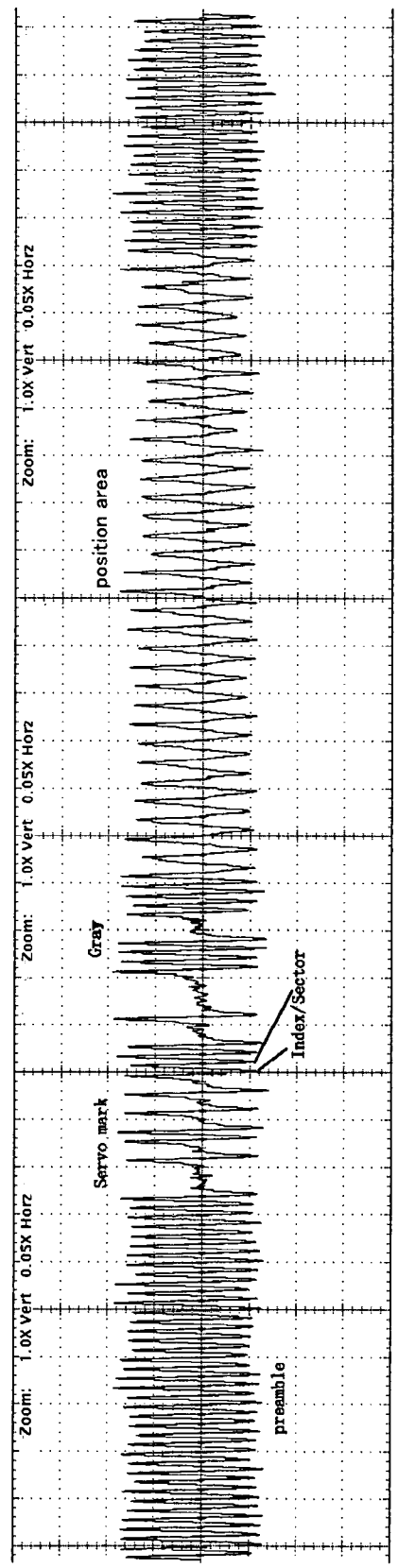
FIG. 9 is a view showing an example of readout result obtained by a magnetic head in the vicinity of a servo frame on a magnetic disc of a magnetic disc device according to the present embodiment.

FIG. 9 shows an example of readout result obtained by the magnetic head 31 in the vicinity of a servo frame on the magnetic disc 10 of the magnetic disc device 1 according to the present embodiment. In this example, an index bit storing section 12 (index bit: Index) and a sector bit storing section 13 (sector bit: Sector) appear following a Servo Mark.

The actuator 30, which moves the magnetic head 31 in the direction of the radium of the magnetic disc 10, is equipped with a VCM (Voice Coil Motor), for example, for use in positioning the magnetic head 31.

The controller 20 controls various kinds of processing, such as switching magnetic heads 31, positioning the magnetic heads 31 to the magnetic discs 10, writing/reading data onto the magnetic discs 10, performed in the magnetic disc device 1.

To be more specific, the controller 20 controls the VCM to perform positioning control of the magnetic head 31. By controlling a spindle motor (see FIG. 10), the controller 20 controls rotation of the magnetic disc 10. In addition, the controller 20 also controls an HDIC (Head IC) 44 (see FIG. 10), thereby controlling data writing/data reading performed by the magnetic head 31. Under such control, the controller 20 accesses the surface (storage area 15) of a predetermined magnetic disc 10 by means of a predetermined magnetic head 31 so as to write/read data thereon/therefrom.

The controller 20, as shown in FIG. 1, has a storage area recognizing unit 21, a provisional index pattern obtaining unit 22, a first hamming distance calculator 23, an index pattern verifying unit 24, a position recognizing unit 25, a provisional sector pattern obtaining unit 26, a second hamming distance calculator 27, and a sector pattern verifying unit 28.

The provisional index pattern obtaining unit 22 obtains a provisional index pattern based on index bits obtained by the magnetic head 31. The index bits that are obtained by the magnetic head 31 from servo frames 11 on the storage area 15, are sequentially arranged in a memory space (not shown) in the order in which they are obtained, thereby forming an index bit string.

When the number of bits having been obtained reaches a predetermined number (the same number as the number of bits composing the index pattern: 16 in the present embodiment), the provisional index pattern obtaining unit 22 recognizes the index bit string (hereinafter, an index bit string composed of index bits that are actually obtained by the magnetic head 31, will sometimes be called a "provisional index bit string") as a provisional index pattern.

The first hamming distance calculator 23 calculates the hamming distances between the provisional index pattern obtained by the provisional index pattern obtaining unit 22 and index patterns (original index patterns) that are assigned, in advance, one to each storage area 15.

The controller 20 of the magnetic disc device 1 manages a magnetic head 31 (that is, a storage area 15 to which the magnetic head 31 is currently accessing) that is currently accessing a storage area 15, so that the first hamming distance calculator 23 can recognize which one of the storage areas 15 is accessed by the magnetic head 31.

The first hamming distance calculator 23 obtains an original index pattern given to the storage area 15 to which the magnetic head 31 is expected to be currently accessing, and then calculates the hamming distance between the provisional index pattern and the thus obtained original index pattern.

The index pattern verifying unit 24 determines that the provisional index pattern is an index pattern based on the hamming distance calculated by the first hamming distance calculator 23 {if the hamming distance is a predetermined value (three, for instance) or greater in the present embodiment}.

The storage area recognizing unit 21 recognizes the storage area 15 based on the index bits obtained by the magnetic head (index bit obtaining unit) 31. On the basis of the index pattern verified by the index pattern verifying unit 24, the storage area recognizing unit 21 recognizes the storage area 15. In other words, the storage area recognizing unit 21 recognizes which one of the storage areas 15 the verified index pattern is assigned to, the storage area 15 being thereby identified.

On the basis of the index bit string that is verified to be an index pattern by the index pattern verifying unit 24, the provisional sector pattern obtaining unit 26 obtains, as a provisional sector pattern, a sector bit string that is associated with this index bit string, or a sector bit string obtained by arranging the sector bits stored in the servo frames 11 that store the index bits composing the index bit string.

That is, the provisional sector pattern obtaining unit 26 obtains a provisional sector pattern based on index bits obtained by magnetic head 31.

In addition, the provisional sector pattern obtaining unit 26 refers to low-order five bits of the thus-obtained provisional sector pattern so as to recognize how manieth sector pattern (sector number) in the storage area 15 the provisional sector pattern is, when counted from the leading sector pattern (which starts with the index frame), and then notifies the second hamming distance calculator 27 of the sector number.

The second hamming distance calculator 27 calculates the hamming distance between the provisional sector pattern that is obtained by the provisional sector pattern obtaining unit 26 and an individual sector pattern. The second hamming distance calculator 27 calculates the hamming distance between the provisional sector pattern and a sector pattern (hereinafter also called an "original sector pattern") that is associated with the sector number (ordinal rank from the leading part of the storage area 15) received from the provisional sector pattern obtaining unit 26.

On the basis of the hamming distance obtained by the second hamming distance calculator 27 {if the hamming distance is a predetermined value (four, for instance) or smaller in the present embodiment}, the sector pattern verifying unit 28 determines that the object provisional sector pattern is identical with a sector pattern.

The position recognizing unit 25 recognizes an index pattern based on sector bits obtained by magnetic head 31, thereby recognizing a position of a servo frame 11 on the storage area 15. On the basis of the sector pattern verified by the sector pattern verifying unit 28, the position recognizing unit 25 recognizes positions of the servo frames 11 on the storage area 15, each of which servo frames 11 has a sector bit storing section 13 that stores one of the sector bits composing the provisional sector pattern.

Figure 10:
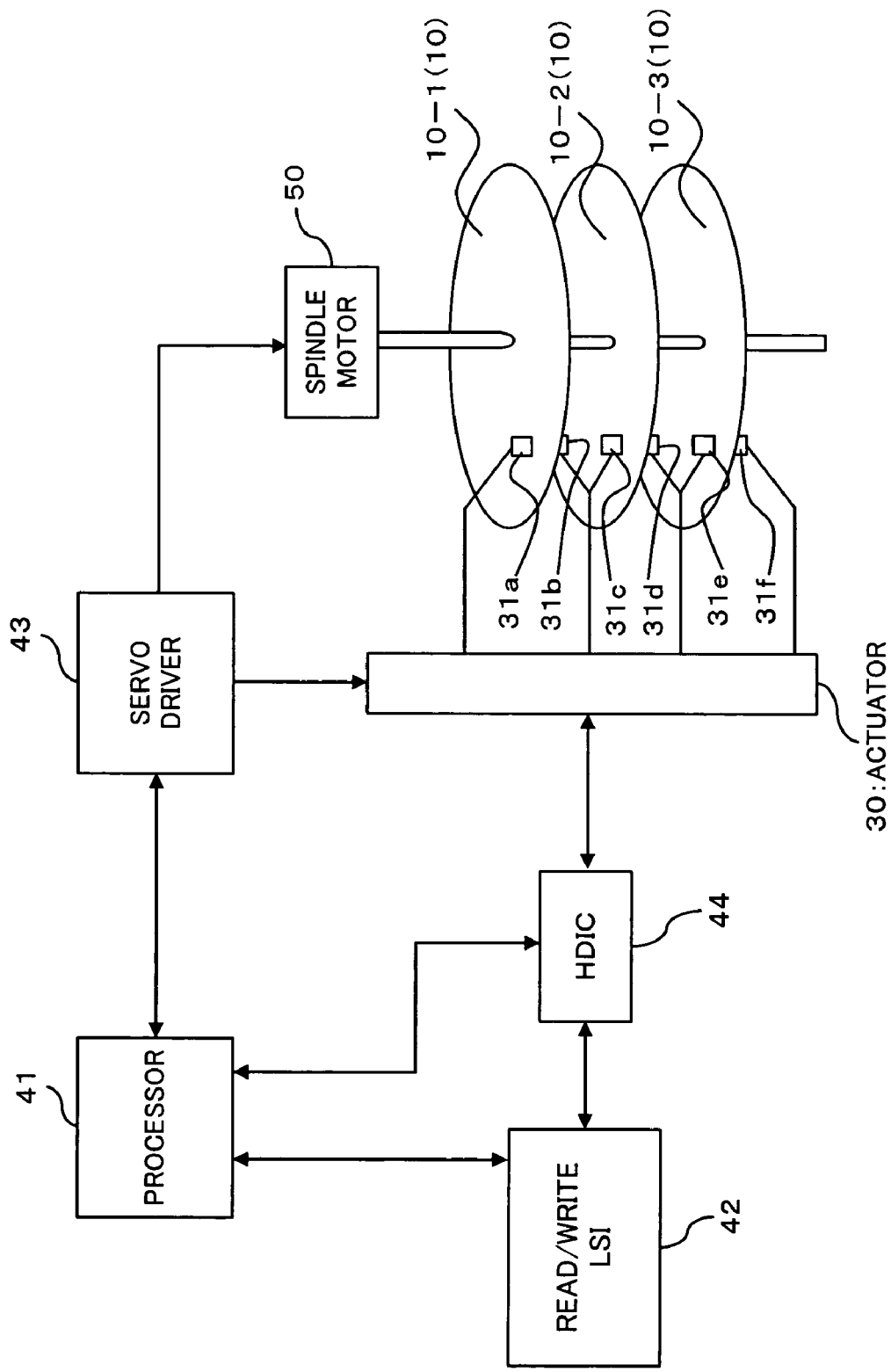
FIG. 10 is block diagram schematically showing hardware configuration of a magnetic disc device (storage apparatus) according to the present embodiment.

FIG. 10 depicts hardware construction of the magnetic disc device 1 according to the present embodiment. The magnetic disc device 1, as shown in FIG. 10, has a processor 41, a read/write LSI 42, a servo driver 43, an IDIC 44, a spindle motor 50, and magnetic discs 10 (10-1, 10-2, and 10-3).

The processor 41 runs applications recorded on a ROM (not shown) or the like, thereby controlling a various kinds of processing performed on the magnetic disc device 1.

The servo driver 43 controls the actuator 30 and the spindle motor 50. The IDIC 44 controls data reading/writing of the magnetic head 31 from/onto the magnetic disc 10. The read/write LSI (Large Scale Integration) 48 controls data reading/writing of the IDIC 44.

The processor 41 of the magnetic disc device 1 runs programs recorded on a ROM or the like, thereby functioning as the aforementioned storage area recognizing unit 21, provisional index pattern obtaining unit 22, first hamming distance calculator 23, index pattern verifying unit 24, position recognizing unit 25, provisional sector pattern obtaining unit 26, second hamming distance calculator 27, and sector pattern verifying unit 28.

Figure 11:
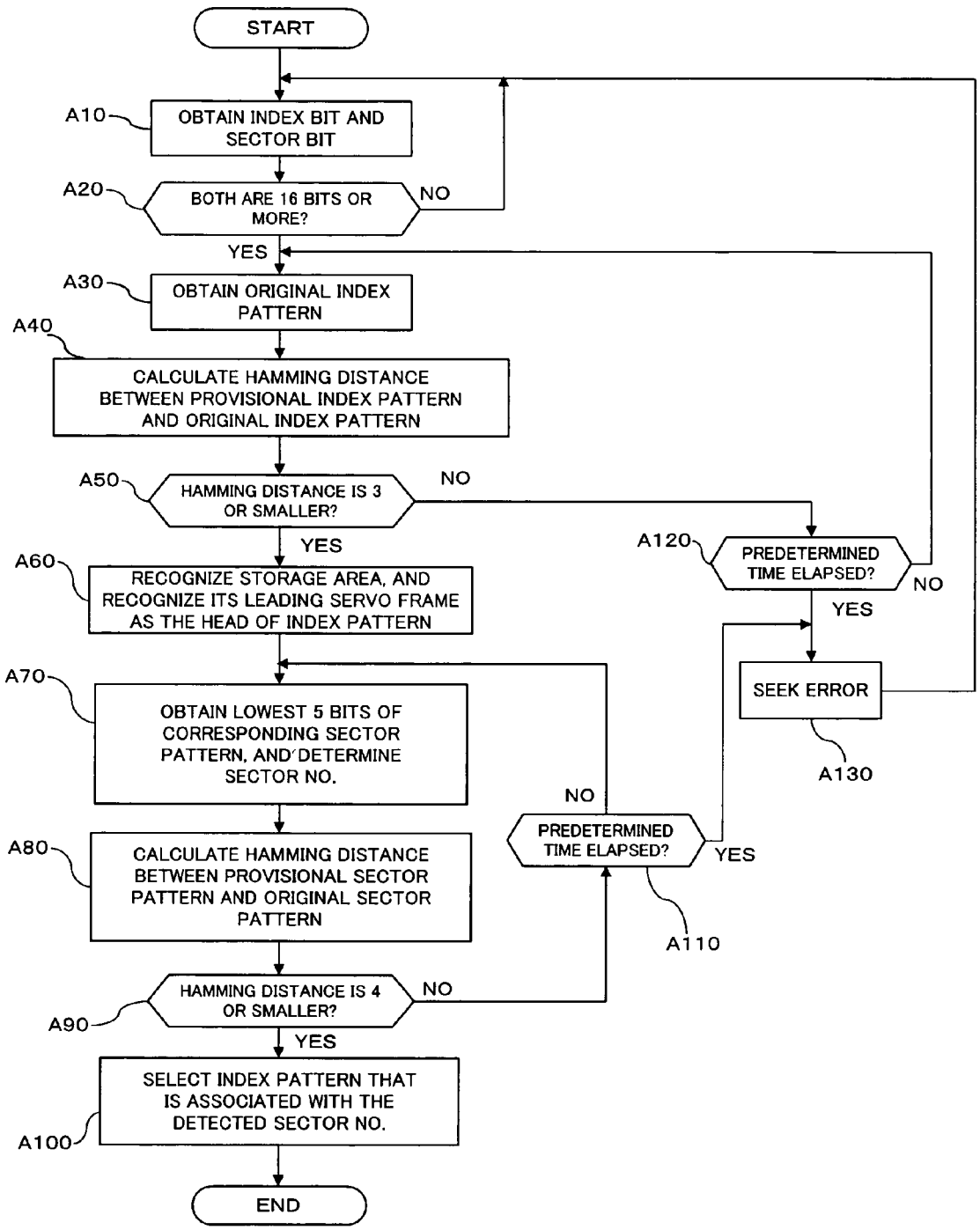
FIG. 11 is a flowchart for describing a head positioning method for a magnetic head of the magnetic disc device according to the present embodiment.
Figure 13:
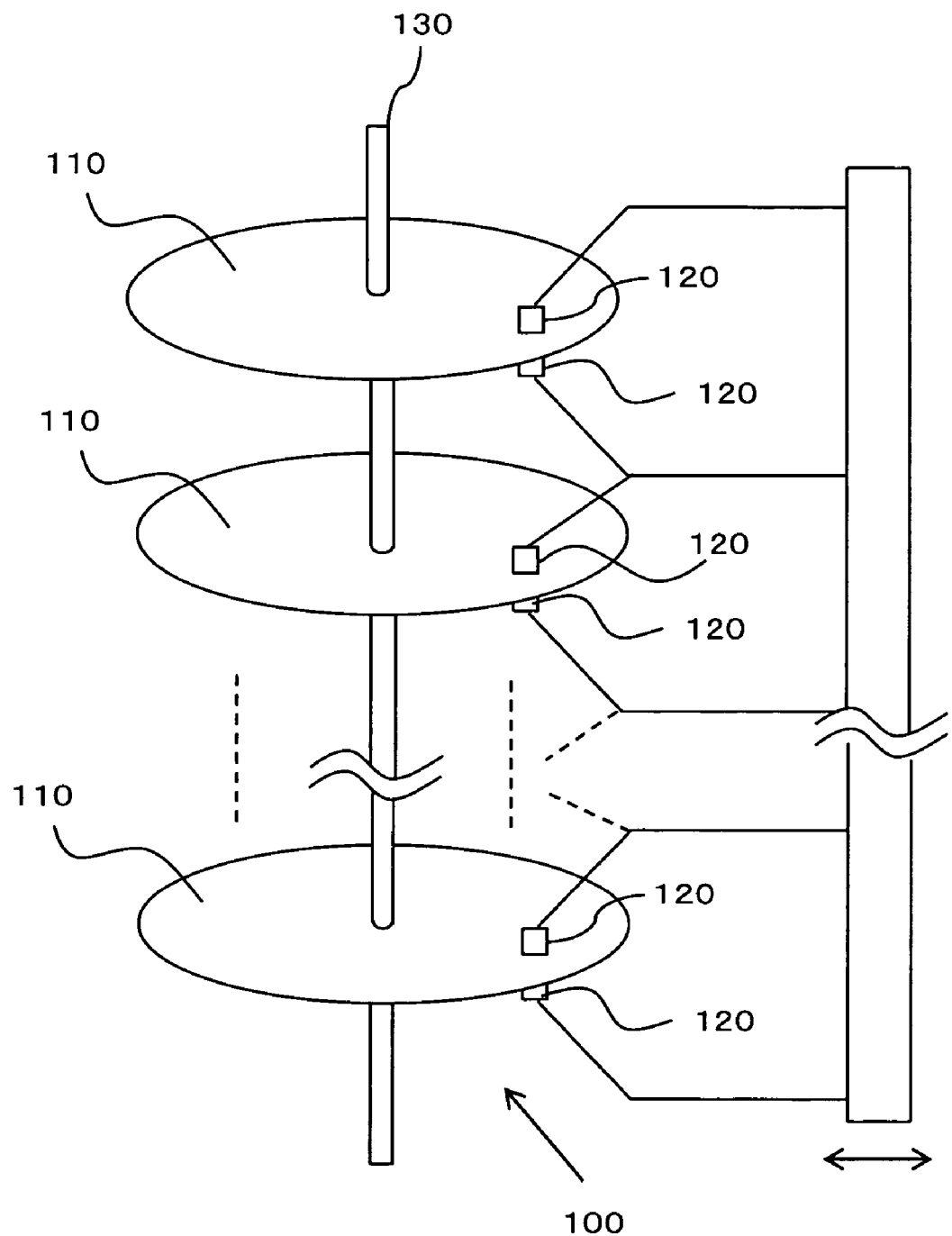
FIG. 13 is a diagram schematically showing a conventional magnetic storage apparatus.
Figure 14:
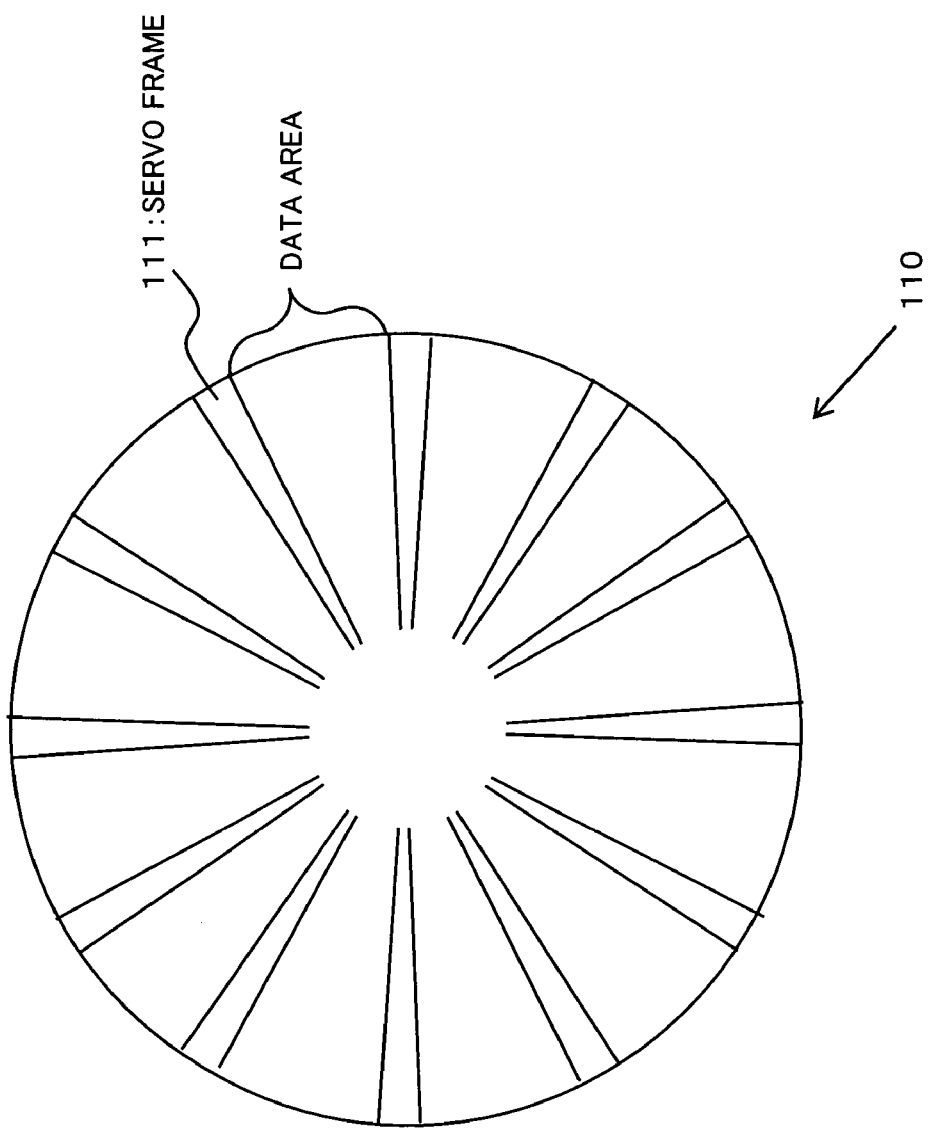
FIG. 14 is a diagram schematically showing a magnetic disc used in the conventional magnetic storage apparatus of FIG. 13.

A method for positioning the magnetic head 31 of the magnetic disc device 1 according to the present embodiment will be hereinafter described with reference to the flow chart (step A10 through step A130) of FIG. 11.

The controller 20 makes the magnetic head 31 access the storage area 15 of the magnetic disc device 1 to obtain an index bit and a sector bit stored in an individual index bit storing section 12 and an individual sector bit storing section 13, respectively (step A10). The controller 20 (provisional index pattern obtaining unit 22) repeats this process till both the number of index bits and the number of sector bits obtained reach or exceed 16, respectively (step A20).

The first hamming distance calculator 23 obtains an index pattern (original index pattern) that has been assigned in advance to the storage area 15 (step A30), and then, the hamming distance between the index bit string (provisional index pattern) obtained by the magnetic head 31 and the original index pattern (step A40) is calculated.

The index pattern verifying unit 24 evaluates whether or not the above hamming distance is a predetermined value ("3" in the present embodiment) or smaller (step A50). If the hamming distance is four or greater (NO route of step A50), it is then evaluated whether or not predetermined time has elapsed since the provisional index pattern was obtained (step A120). If the evaluation result is negative (NO route of step A120), the procedure returns to step A30. On the other hand, if the evaluation result is positive (YES route of step A120), an occurrence of a seek error is informed to an upper apparatus not shown (a computer, or the like) (step A130), and the procedure returns to step A10.

At step A50, if it is decided that the hamming distance is three or smaller (YES route of step A50), the storage area recognizing unit 21 recognizes that the object storage area 15 is that which is associated with the original index pattern. The provisional sector pattern obtaining unit 26 recognizes the servo frame that stores the leading one of the index bits composing the provisional index pattern as the leading frame of the index pattern (step A60), and a sector bit string corresponding to the index pattern (index bit string) is recognized as a provisional sector pattern.

On the basis of low-order five bits of the thus obtained sector pattern, which has been obtained by the provisional sector pattern obtaining unit 26, the provisional sector pattern obtaining unit 26 then decides a sector number (step A70), and the second hamming distance calculator 27 calculates the hamming distance between the provisional sector pattern and an original sector pattern that is associated with the sector number (step A80).

After that, the sector pattern verifying unit 28 evaluates whether or not this hamming distance is a predetermined value ("4" in the present embodiment) or smaller. If the hamming distance is five or more (NO route of step A90), it is then evaluated whether or not predetermined time has elapsed since the storage area 15 was identified (step A110). If the evaluation result is negative (NO route of step A110), the procedure returns back to step A70. On the other hand, if the evaluation result is positive (YES route of step A110), the procedure proceeds to step A130.

On the other hand, if the hamming distance is four or smaller (YES route of step A90), the sector pattern, whose sector pattern number is identical with the sector number detected at step A70, is recognized as a sector pattern corresponding to the provisional sector pattern (step A100)

On the basis of this sector number, the position recognizing unit 25 recognizes positions of servo frames 11 that store the sector bits composing the sector pattern.

In this manner, with the magnetic disc device 1 according to the present embodiment, index bits stored one in each of the index bit storing sections 12 of the individual servo frames 11, are sequentially arranged, thereby forming an index bit string. Since an identical index pattern that is associated with an object storage area 15 repeatedly appears in this index bit string, it is possible to recognize the object storage area 15 based on the index bits stored in the individual index bit storing sections 12 of the servo frames 11, at high speed with high reliability.

Further, partly since an individual storage area 15 of the magnetic disc device 1 is associated with an index pattern unique to the storage area 15, and partly since the identical index pattern repeatedly appears in an index bit string which is composed of the index bits stored in the index bit storing sections 12 of the servo frames 11, it is possible to recognize the storage area 15 at high speed with high reliability, by identifying its associated index pattern.

In other words, it is possible to recognize the storage area (head number) 15 based on the index bits obtained by the magnetic head 31, thereby facilitating high-speed and highly reliable recognition of the storage area (head number) 15.

Concretely, if an object index pattern is 16-bit information, it is required to read-out only 16 index bits, at the minimum, from servo frames 11 to recognize a storage area 15, so that high-speed processing is realized.

Still further, the hamming distances between pairs of index patterns, each of which is unique to an individual storage area 15, are a predetermined value (four in the present embodiment) or greater. Thus, on the basis of such hamming distances calculated by the first hamming distance calculator 23, the index pattern verifying unit 24 confirms a provisional index pattern to be an index pattern. More specifically, when comparing the provisional index pattern with an original index pattern, if the hamming distance between these two is found to be smaller than the predetermined value, the provisional index pattern is identified to be identical with the original index pattern. On the basis of the thus identified index pattern, the object storage area 15 is easily identified.

Additionally, with this feature, even if the provisional index pattern and its corresponding original index pattern do not have exactly the same bit patterns, due to a read error, or the like, it is still possible to recognize that the provisional index pattern is identical with the original index pattern, thus realizing evaluation with high redundancy. Moreover, the storage area recognizing unit 21 is capable of easily recognizing the storage area 15 based on the index pattern identified by the index pattern verifying unit 24.

Further, since only part (one bit in the present embodiment) of an index pattern needs to be stored in the index bit storing sections 12 of the servo frames 11 to realize the forgoing method, it is possible to efficiently use the magnetic disc 10 (storage area 15).

Still further, since a sector pattern is employed to recognize a position of each index pattern in the storage area 15, so that a position of each servo frame in the storage area 15 can also be recognized, it is thus possible to recognize where the magnetic head 31 is positioned in the storage area 15 rapidly and reliably.

In the storage area 15, sector patterns with different bit patterns are previously assigned one for each of the index patterns to indicate their positions in the storage area 15. Therefore, if a sector pattern is identified, it is possible to easily and rapidly recognize the position of its associated index pattern, or the positions of the servo frames 11 that store the index bits composing the index pattern, so that the position of the magnetic head 31 can be rapidly recognized with high reliability.

Furthermore, since the foregoing method is realized by storing part (one bit in the present embodiment) of a sector pattern in the sector bit storing sections 13 of the servo frames 11, it is possible to use the magnetic disc 10 (storage area 15) efficiently.

In addition, the index patterns having an identical bit patterns are associated with different sector patterns, and the hamming distances between pairs of such sector patterns are a predetermined value or greater. Therefore, the sector pattern verifying unit 28 recognizes a provisional sector pattern as a sector pattern if the hamming distance calculated by the second hamming distance calculator 27 is a predetermined value or smaller. More specifically, when comparing the provisional sector pattern with an original sector pattern, if the hamming distance between these two is found to be smaller than the predetermined value, the provisional sector pattern is identified to be identical with the original sector pattern. On the basis of the thus identified sector pattern, the positions of the servo frames 11 on the storage area 15, each of which servo frames 11 has a sector bit storing section 13 that stores one of the sector bits composing the provisional sector pattern, are easily recognized, so that the position of the magnetic head 31 can be rapidly recognized with high reliability.

Moreover, with the above feature, even if the provisional sector pattern and its corresponding original sector pattern do not exhibit exactly the same bit patterns, due to a read error, or the like, it is still possible to recognize that the provisional sector pattern is identical with the original sector pattern, thus realizing evaluation with high redundancy.

On the basis of the sector pattern verified by the sector pattern verifying unit 28, the position recognizing unit 25 recognizes positions of the servo frames 11 on the storage area 15, each of which servo frames 11 has a sector bit storing section 13 that stores one of the sector bits composing the provisional sector pattern. It is thus possible to easily recognize the positions of the servo frames, so that the position of the magnetic head 31 can be rapidly recognized with high reliability.

The present invention should by no means be limited to the above-illustrated embodiment, and various changes or modifications may be suggested without departing from the gist of the invention.

For example, in the foregoing embodiment, the description was made on a case where the magnetic disc device 1 has three magnetic discs, 10-1, 10-2, and 10-3. The present invention should by no means be limited to this, and the magnetic disc device 1 can be equipped with one or two magnetic discs, or four or more magnetic discs.

Further, in the aforementioned embodiment, there were provided storage areas 15 on both sides of the magnetic disc 10. The present invention should by no means be limited to this, and there can be provided only one storage area 15 on either side of the magnetic disc 10.

Still further, in the above embodiment, two bits of 0s were used as a gap pattern. The present invention should by no means be limited to this, and any other modification is also applicable without departing from the gist of the invention.

Furthermore, in the foregoing embodiment, the provisional index pattern obtaining unit 22 arranges the index bits, obtained one from each of the index bit storing sections 12, in the order in which they are obtained, thereby creating an index bit string. When the number of bits included in the index bit string reaches a predetermined number, the provisional index pattern obtaining unit 22 recognizes the index bit string as a provisional index pattern. The present invention should by no means be limited to this, and a provisional index pattern can be obtained based on the hamming distance between a provisional index bit string and an index pattern corresponding to an object storage area 15. At that time, as has already been described, the hamming distances between the object index pattern itself and the bit patterns obtained by shifting the object index pattern by one place or more, are a predetermined value (6 in the present embodiment) or greater.

Accordingly, every time magnetic head 31 obtains an index bit, the hamming distance can be calculated between a provisional index bit string currently created and an index pattern that has been previously assigned to (associated with) an object storage area 15. If the hamming distance is, for example, four or smaller, the index bit string is recognized as a provisional index pattern.

Moreover, in the above embodiment, the first hamming distance calculator 23 obtains an original index pattern that is associated with the storage area 15 to which magnetic head 31 is supposed to be currently accessing. The present invention should by no means be limited to this, and the hamming distances can be calculated between an provisional index pattern and all the original index patterns associated, one with each storage area 15 of the magnetic disc device 1. With this feature, it is possible to speedily recognize a specific one of the storage areas 15 (head number) with high reliability.

At this time, on the basis of the hamming distances calculated by the first hamming distance calculator 23, the index pattern verifying unit 24 can recognize a provisional index pattern that exhibits, for example, the minimum hamming distance as an index pattern.

In the above embodiment, the second hamming distance calculator 27 calculates the hamming distance between a provisional sector pattern and a sector pattern that is associated with the sector number notified from the provisional sector pattern obtaining unit 26. On the basis of the thus calculated hamming distance, the sector pattern verifying unit 28 recognizes a sector pattern. The present invention should by no means be limited to this, and the position recognizing unit 25 can directly identify the positions of servo frames 11 that store individual sector bits of a provisional sector pattern, based on low-order five bits of the provisional sector pattern. With this feature, not only the apparatus can be simplified, but the processing rate can also be improved.

Further, the foregoing embodiment employs such an example index pattern as is shown in FIG. 3. The present invention should by no means be limited to this, and any other modification can be made, such as an index pattern of 15 bits or less, or 16 bits or more, without departing from the gist of the present invention.

Still further, instead of the sector patterns shown in FIG. 7, any other sector patterns, such as those of 15 bits or less or those of 16 bits or more, are also applicable. Any other 16-bit sector patterns having bit patterns different from those shown in FIG. 7 are also applicable without departing from the gist of the present invention.

For instance, FIG. 12 shows sector patterns having another set of bit patterns. These sector patterns can also be used in the magnetic disc device 1 according to the foregoing embodiment. In FIG. 12, an individual binary sector pattern is associated with its corresponding decimal number system value. Note that the sector patterns of FIG. 7 are obtained by rearranging the sector patterns of FIG. 12 in such a manner that low-order five bits of the individual sector patterns express consecutive binary values.

Moreover, in the above embodiment, low-order five bits of each sector pattern shows a sector number in binary form. The present invention should by no means be limited to this, and any other sector patterns are also applicable whose low-order five bits do not show such sector numbers.

Furthermore, the controller 20 according to the above embodiment has a storage area recognizing unit 21, a provisional index pattern obtaining unit 22, a first hamming distance calculator 23, an index pattern verifying unit 24, a position recognizing unit 25, a provisional sector pattern obtaining unit 26, a second hamming distance calculator 27, and a sector pattern verifying unit 28. The present invention should by no means be limited to this, and some of these parts can also perform any other processing.

What is claimed is:

1. A storage apparatus having a plurality of round storage areas, on each of which a plurality of servo frames are arranged at uniform intervals in a spoke-like pattern, said apparatus comprising:

an index bit storing section provided to each said servo frame arranged in each individual one of said plurality of storage areas, said index bit storing section storing, as an index bit, part of an index pattern having a specific bit pattern, which index pattern is operable to identify the individual storage area;

an index bit obtaining unit for obtaining such index bits, each of which is stored in the index bit storing section of each said servo frame arranged in the individual storage area, one after another; and a storage area recognizing unit for recognizing the individual storage area based on the index bits, which are obtained by said index bit obtaining unit, a sector bit storing section provided to each said servo frame arranged in each said storage areas, said sector bit storing section storing, as a sector bit, part of a sector pattern which is operable to identify a position of such index pattern in the individual storage area, in association with the corresponding index bit storing section;

a sector bit obtaining unit for obtaining such sector bit from the sector bit storing section of each said servo frame arranged in the individual storage area, one after another; and a position recognizing unit for recognizing a position of each said servo frame in the individual storage area based on such sector bits obtained by said sector bit obtaining unit, wherein the index bits, each of which is stored in the index bit storing section of each said servo frame arranged in the individual storage area, being adapted to form, when being sequentially arranged, an index bit string which includes a plurality of index patterns each having the specific bit pattern, and wherein said position recognizing unit (i) recognizes a position of the sector bits, constituting the sector pattern, in the storage area based on such sector bits obtained by said sector bit obtaining unit, (ii) recognizes a position of the index pattern corresponding to the sector pattern based on the recognized position of the sector bits, and (iii) recognizes the position of each said servo frame in the individual storage area based on the recognized position of the index pattern.

2. A storage apparatus as set forth in claim 1, wherein each of said plurality of storage areas is associated with such index pattern that is unique to each said storage area.

3. A storage apparatus as set forth in claim 2, wherein hamming distance between any two of the index patterns, which index patterns are associated one with each of said storage areas, is a predetermined value or greater.

4. A storage apparatus as set forth in claim 1 further comprising:

a provisional index pattern obtaining unit for obtaining a provisional index pattern based on the index bits obtained by said index bit obtaining unit;

a first hamming distance calculator for calculating hamming distances between the provisional index pattern, which is obtained by said provisional index pattern obtaining unit, and the index patterns; and an index pattern verifying unit for verifying that the provisional index pattern is such index pattern, based on the hamming distances, which are calculated by said first hamming distance calculator, said storage area recognizing unit recognizing the individual storage area based on the index pattern which is verified by said index pattern verifying unit.

5. A storage apparatus as set forth in claim 2 further comprising:

a provisional index pattern obtaining unit for obtaining a provisional index pattern based on the index bits obtained by said index bit obtaining unit;

a first hamming distance calculator for calculating hamming distances between the provisional index pattern, which is obtained by said provisional index pattern obtaining unit, and the index patterns; and an index pattern verifying unit for verifying that the provisional index pattern is such index pattern, based on the hamming distances, which are calculated by said first hamming distance calculator, said storage area recognizing unit recognizing the individual storage area based on the index pattern which is verified by said index pattern verifying unit.

6. A storage apparatus as set forth in claim 3 further comprising:

a provisional index pattern obtaining unit for obtaining a provisional index pattern based on the index bits obtained by said index bit obtaining unit;

a first hamming distance calculator for calculating hamming distances between the provisional index pattern, which is obtained by said provisional index pattern obtaining unit, and the index patterns; and an index pattern verifying unit for verifying that the provisional index pattern is such index pattern, based on the hamming distances, which are calculated by said first hamming distance calculator, said storage area recognizing unit recognizing the individual storage area based on the index pattern which is verified by said index pattern verifying unit.

7. A storage apparatus as set forth in claim 2, further comprising:

a sector bit storing section provided to each said servo frame arranged in each said storage areas, said sector bit storing section storing, as a sector bit, part of a sector pattern which is operable to identify a position of such index pattern in the individual storage area, in association with corresponding index bit storing section;

a sector bit obtaining unit for obtaining such sector bit from the sector bit storing section of each said servo frame arranged in the individual storage area, one after another; and a position recognizing unit for recognizing a position of each said servo frame in the individual storage area based on such sector bits obtained by said sector bit obtaining unit.

8. A storage apparatus as set forth in claim 3, further comprising:

a sector bit storing section provided to each said servo frame arranged in each said storage areas, said sector bit storing section storing, as a sector bit, part of a sector pattern which is operable to identify a position of such index pattern in the individual storage area, in association with corresponding index bit storing section;

a sector bit obtaining unit for obtaining such sector bit from the sector bit storing section of each said servo frame arranged in the individual storage area, one after another; and a position recognizing unit for recognizing a position of each said servo frame in the individual storage area based on such sector bits obtained by said sector bit obtaining unit.

9. A storage apparatus as set forth in claim 4, further comprising:

a sector bit storing section provided to each said servo frame arranged in each said storage areas, said sector bit storing section storing, as a sector bit, part of a sector pattern which is operable to identify a position of such index pattern in the individual storage area, in association with corresponding index bit storing section;

a sector bit obtaining unit for obtaining such sector bit from the sector bit storing section of each said servo frame arranged in the individual storage area, one after another; and a position recognizing unit for recognizing a position of each said servo frame in the individual storage area based on such sector bits obtained by said sector bit obtaining unit.

10. A storage apparatus as set forth in claim 5, further comprising:

a sector bit storing section provided to each said servo frame arranged in each said storage areas, said sector bit storing section storing, as a sector bit, part of a sector pattern which is operable to identify a position of such index pattern in the individual storage area, in association with corresponding index bit storing section;

a sector bit obtaining unit for obtaining such sector bit from the sector bit storing section of each said servo frame arranged in the individual storage area, one after another; and a position recognizing unit for recognizing a position of each said servo frame in the individual storage area based on such sector bits obtained by said sector bit obtaining unit.

11. A storage apparatus as set forth in claim 6, further comprising:

a sector bit storing section provided to each said servo frame arranged in each said storage areas, said sector bit storing section storing, as a sector bit, part of a sector pattern which is operable to identify a position of such index pattern in the individual storage area, in association with corresponding index bit storing section;

a sector bit obtaining unit for obtaining such sector bit from the sector bit storing section of each said servo frame arranged in the individual storage area, one after another; and a position recognizing unit for recognizing a position of each said servo frame in the individual storage area based on such sector bits obtained by said sector bit obtaining unit.

12. A storage apparatus as set forth in claim 1, wherein, in each said storage area, each of said plurality of index patterns is associated with a unique sector pattern that is unique to each said index pattern.

13. A storage apparatus as set forth in claim 9, wherein, in each said storage area, each of said plurality of index patterns is associated with a unique sector pattern that is unique to each said index pattern.

14. A storage apparatus as set forth in claim 12, wherein hamming distance between any two of the unique sector patterns, which are associated one with each of said index patterns, is a predetermined value or greater.

15. A storage apparatus as set forth in claim 13, wherein hamming distance between any two of the unique sector patterns, which are associated one with each of said index patterns, is a predetermined value or greater.

16. A storage apparatus as set forth in claim 4, further comprising:
- a provisional sector pattern obtaining unit for obtaining a provisional sector pattern based on the sector bits obtained by said sector bit obtaining unit;
- a second hamming distance calculator for calculating hamming distance between the provisional sector pattern, which is obtained by said provisional sector pattern obtaining unit, and the sector pattern; and
- a sector pattern verifying unit for verifying that the provisional sector pattern is such sector pattern, based on the hamming distance, which is calculated by said first hamming distance calculator,
- said position recognizing unit recognizing, based on the sector pattern that is verified by said sector pattern verifying unit, a position of each said servo frame in the individual storage area, each said servo frame having such sector bit storing section each storing individual sector bit that is part of the provisional sector pattern.

17. A storage apparatus as set forth in claim 5, further comprising:
- a provisional sector pattern obtaining unit for obtaining a provisional sector pattern based on the sector bits obtained by said sector bit obtaining unit;
- a second hamming distance calculator for calculating hamming distance between the provisional sector pattern, which is obtained by said provisional sector pattern obtaining unit, and the sector pattern; and
- a sector pattern verifying unit for verifying that the provisional sector pattern is such sector pattern, based on the hamming distance, which is calculated by said first hamming distance calculator,
- said position recognizing unit recognizing, based on the sector pattern that is verified by said sector pattern verifying unit, a position of each said servo frame in the individual storage area, each said servo frame having such sector bit storing section each storing individual sector bit that is part of the provisional sector pattern.

18. A storage apparatus as set forth in claim 6, further comprising:
- a provisional sector pattern obtaining unit for obtaining a provisional sector pattern based on the sector bits obtained by said sector bit obtaining unit;
- a second hamming distance calculator for calculating hamming distance between the provisional sector pattern, which is obtained by said provisional sector pattern obtaining unit, and the sector pattern; and
- a sector pattern verifying unit for verifying that the provisional sector pattern is such sector pattern, based on the hamming distance, which is calculated by said first hamming distance calculator,
- said position recognizing unit recognizing, based on the sector pattern that is verified by said sector pattern verifying unit, a position of each said servo frame in the individual storage area, each said servo frame having such sector bit storing section each storing individual sector bit that is part of the provisional sector pattern.

19. A storage apparatus as set forth in claim 1, further comprising:
- a provisional sector pattern obtaining unit for obtaining a provisional sector pattern based on the sector bits obtained by said sector bit obtaining unit;
- a second hamming distance calculator for calculating hamming distance between the provisional sector pattern, which is obtained by said provisional sector pattern obtaining unit, and the sector pattern; and
- a sector pattern verifying unit for verifying that the provisional sector pattern is such sector pattern, based on the hamming distance, which is calculated by said first hamming distance calculator,
- said position recognizing unit recognizing, based on the sector pattern that is verified by said sector pattern verifying unit, a position of each said servo frame in the individual storage area, each said servo frame having such sector bit storing section each storing individual sector bit that is part of the provisional sector pattern.

20. A storage apparatus as set forth in claim 7, further comprising:
- a provisional sector pattern obtaining unit for obtaining a provisional sector pattern based on the sector bits obtained by said sector bit obtaining unit;
- a second hamming distance calculator for calculating hamming distance between the provisional sector pattern, which is obtained by said provisional sector pattern obtaining unit, and the sector pattern; and
- a sector pattern verifying unit for verifying that the provisional sector pattern is such sector pattern, based on the hamming distance, which is calculated by said first hamming distance calculator,
- said position recognizing unit recognizing, based on the sector pattern that is verified by said sector pattern verifying unit, a position of each said servo frame in the individual storage area, each said servo frame having such sector bit storing section each storing individual sector bit that is part of the provisional sector pattern.

21. A storage apparatus as set forth in claim 9, further comprising:
- a provisional sector pattern obtaining unit for obtaining a provisional sector pattern based on the sector bits obtained by said sector bit obtaining unit;
- a second hamming distance calculator for calculating hamming distance between the provisional sector pattern, which is obtained by said provisional sector pattern obtaining unit, and the sector pattern; and
- a sector pattern verifying unit for verifying that the provisional sector pattern is such sector pattern, based on the hamming distance, which is calculated by said first hamming distance calculator,
- said position recognizing unit recognizing, based on the sector pattern that is verified by said sector pattern verifying unit, a position of each said servo frame in the individual storage area, each said servo frame having such sector bit storing section each storing individual sector bit that is part of the provisional sector pattern.

22. A storage apparatus as set forth in claim 12, further comprising:
- a provisional sector pattern obtaining unit for obtaining a provisional sector pattern based on the sector bits obtained by said sector bit obtaining unit;
- a second hamming distance calculator for calculating hamming distance between the provisional sector pattern, which is obtained by said provisional sector pattern obtaining unit, and the sector pattern; and a sector pattern verifying unit for verifying that the provisional sector pattern is such sector pattern, based on the hamming distance, which is calculated by said first hamming distance calculator, said position recognizing unit recognizing, based on the sector pattern that is verified by said sector pattern verifying unit, a position of each said servo frame in the individual storage area, each said servo frame having such sector bit storing section each storing individual sector bit that is part of the provisional sector pattern.

23. A storage apparatus as set forth in claim 13, further comprising:
a provisional sector pattern obtaining unit for obtaining a provisional sector pattern based on the sector bits obtained by said sector bit obtaining unit;
a second hamming distance calculator for calculating hamming distance between the provisional sector pattern, which is obtained by said provisional sector pattern obtaining unit, and the sector pattern; and
a sector pattern verifying unit for verifying that the provisional sector pattern is such sector pattern, based on the hamming distance, which is calculated by said first hamming distance calculator,
said position recognizing unit recognizing, based on the sector pattern that is verified by said sector pattern verifying unit, a position of each said servo frame in the individual storage area, each said servo frame having such sector bit storing section each storing individual sector bit that is part of the provisional sector pattern.

24. A storage apparatus as set forth in claim 14, further comprising:
a provisional sector pattern obtaining unit for obtaining a provisional sector pattern based on the sector bits obtained by said sector bit obtaining unit;
a second hamming distance calculator for calculating hamming distance between the provisional sector pattern, which is obtained by said provisional sector pattern obtaining unit, and the sector pattern; and
a sector pattern verifying unit for verifying that the provisional sector pattern is such sector pattern, based on the hamming distance, which is calculated by said first hamming distance calculator,
said position recognizing unit recognizing, based on the sector pattern that is verified by said sector pattern verifying unit, a position of each said servo frame in the individual storage area, each said servo frame having such sector bit storing section each storing individual sector bit that is part of the provisional sector pattern.

25. A storage apparatus as set forth in claim 15, further comprising:
a provisional sector pattern obtaining unit for obtaining a provisional sector pattern based on the sector bits obtained by said sector bit obtaining unit;
a second hamming distance calculator for calculating hamming distance between the provisional sector pattern, which is obtained by said provisional sector pattern obtaining unit, and the sector pattern; and
a sector pattern verifying unit for verifying that the provisional sector pattern is such sector pattern, based on the hamming distance, which is calculated by said first hamming distance calculator,
said position recognizing unit recognizing, based on the sector pattern that is verified by said sector pattern verifying unit, a position of each said servo frame in the individual storage area, each said servo frame having such sector bit storing section each storing individual sector bit that is part of the provisional sector pattern.

26. A storage medium having a plurality of round storage areas, on each of which a plurality of servo frames are arranged at uniform intervals in a spoke-like pattern, said medium comprising:
an index bit storing section provided to each said servo frame arranged in each individual one of said plurality of storage areas, said index bit storing section storing, as an index bit, part of an index pattern having a specific bit pattern, which index pattern is operable to identify the individual storage area, and
a sector bit storing section provided to each said servo frame arranged in each individual one of said plurality of storage areas, said sector bit storing section storing, as a sector bit, part of a sector pattern, operable to identify a position of such index pattern in the individual storage area, in association with the corresponding index bit storing section,
wherein the index bits, each of which is stored in the index bit storing section of each said servo frame arranged in the individual storage area, being adapted to form, when being sequentially arranged, an index bit string which includes a plurality of index patterns each having the specific bit pattern,
wherein the sector bits, each of which is stored in the sector bit storing section of each said servo frame arranged in the individual storage area, being adapted to form, when being sequentially arranged, a sector bit string that includes the sector pattern, and
wherein the sector bits constituting the sector pattern are arranged so as to correspond to the index bits constituting the index pattern.

27. A storage medium as set forth in claim 26, wherein each of said plurality of storage areas is associated with such index pattern that is unique to each said storage area.

28. A storage medium as set forth in claim 27, wherein hamming distance between any two of the index patterns, which index patterns are associated one with each of said storage areas, is a predetermined value or greater.

29. A storage medium as set forth in claim 27, further comprising a sector bit storing section provided to each said servo frame arranged in each individual one of said plurality of storage areas, said sector bit storing section storing, as a sector bit, part of a sector pattern, which is operable to identify a position of such index pattern in the individual storage area, in association with corresponding index bit storing section,
the sector bits, each of which is stored in the sector bit storing section of each said servo frame arranged in the individual storage area, being adapted to form, when being sequentially arranged, a sector bit string that includes the sector pattern.

30. A storage medium as set forth in claim 28, further comprising a sector bit storing section provided to each said servo frame arranged in each individual one of said plurality of storage areas, said sector bit storing section storing, as a sector bit, part of a sector pattern, which is operable to identify a position of such index pattern in the individual storage area, in association with corresponding index bit storing section,
the sector bits, each of which is stored in the sector bit storing section of each said servo frame arranged in the individual storage area, being adapted to form, when being sequentially arranged, a sector bit string that includes the sector pattern.

31. A storage medium as set forth in claim 26, wherein, in each said storage area, each of said plurality of index patterns is associated with a unique sector pattern that is unique to each said index pattern.

32. A storage medium as set forth in claim 29, wherein, in each said storage area, each of said plurality of index patterns is associated with a unique sector pattern that is unique to each said index pattern.

33. A storage medium as set forth in claim 30, wherein, in each said storage area, each of said plurality of index patterns is associated with a unique sector pattern that is unique to each said index pattern.

34. A storage medium as set forth in claim 31, wherein hamming distance between any two of the unique sector patterns, which are associated one with each of said index patterns, is a predetermined value or greater.

35. A storage medium as set forth in claim 32, wherein hamming distance between any two of the unique sector patterns, which are associated one with each of said index patterns, is a predetermined value or greater.

36. A storage medium as set forth in claim 33, wherein hamming distance between any two of the unique sector patterns, which are associated one with each of said index patterns, is a predetermined value or greater.

* * * * *